US012603929B2

(12) United States Patent
Lo et al.

(10) Patent No.: US 12,603,929 B2
(45) Date of Patent: Apr. 14, 2026

(54) METRICS COLLECTION AND REPORTING IN 5G MEDIA STREAMING

(71) Applicant: QUALCOMM Incorporated, San Diego, CA (US)

(72) Inventors: Charles Nung Lo, San Diego, CA (US); Thomas Stockhammer, Bergen (DE); Juan Zhang, Beijing (CN); Imed Bouazizi, Frisco, TX (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 18/001,515

(22) PCT Filed: Aug. 17, 2020

(86) PCT No.: PCT/CN2020/109470
§ 371 (c)(1),
(2) Date: Dec. 12, 2022

(87) PCT Pub. No.: WO2022/036491
PCT Pub. Date: Feb. 24, 2022

(65) Prior Publication Data
US 2023/0239333 A1 Jul. 27, 2023

(51) Int. Cl.
*H04L 65/61* (2022.01)
*H04L 43/028* (2022.01)
(Continued)

(52) U.S. Cl.
CPC ............ *H04L 65/61* (2022.05); *H04L 43/028* (2013.01); *H04L 43/06* (2013.01); *H04L 67/53* (2022.05); *H04W 24/08* (2013.01)

(58) Field of Classification Search
CPC ....... H04L 65/61; H04L 67/53; H04L 43/028; H04L 43/06; H04W 24/08
See application file for complete search history.

(56) References Cited

U.S. PATENT DOCUMENTS 7,817,648 B2 10/2010 Rasanen
7,987,490 B2 * 7/2011 Ansari ............. G08B 13/19656
725/82
(Continued)

FOREIGN PATENT DOCUMENTS

CN 106209192 A 12/2016
EP 3446464 B1 5/2020
(Continued)

OTHER PUBLICATIONS

3GPP TSGSSA 5GMS, 3rd Generation Partnership Project Technical Specification Group Services and System Aspects 5G Media Streaming (5GMS), General description and architecture (Release 16), 3GPP TS 26.501, V16.3.1, Mar. 30, 2020 (Mar. 30, 2020), pp. 1-63, sections 5.5.2-5.5.4.
(Continued)

*Primary Examiner* — John A Follansbee
*Assistant Examiner* — Zonghua Du
(74) *Attorney, Agent, or Firm* — Shumaker & Sieffert, P.A.

(57) ABSTRACT

Embodiments include methods for supporting metrics collection and reporting for Fifth Generation (5G) Media Streaming in a 5G system (5GS) network. Various embodiments include systems and methods enabling a Media Session Handler running on a processor of a wireless device connected to a radio access network (RAN) of a 5GS network to receive a metrics configuration message from an application function (AF) server of the 5GS network via a M5 interface, wherein the metrics configuration message indicates one or more metrics measurement, collection and reporting requirements associated with a 5G Media Streaming service, and send a metrics report associated with the media session to the AF server via the M5 interface.

28 Claims, 12 Drawing Sheets

(51) Int. Cl.
H04L 43/06 (2022.01)
H04L 67/53 (2022.01)
H04W 24/08 (2009.01)

(56) References Cited

U.S. PATENT DOCUMENTS

| | | | |
|---|---|---|---|
| 9,398,347 | B2 * | 7/2016 | Jadallah ............. H04L 65/1094 |
| 9,781,019 | B1 * | 10/2017 | Cooley ................. H04L 43/028 |
| 10,067,955 | B1 * | 9/2018 | Wu ........................ G06F 16/285 |
| 10,341,895 | B2 | 7/2019 | Zhu et al. |
| 10,362,507 | B2 * | 7/2019 | Dao .................. H04W 28/0268 |
| 10,397,932 | B2 | 8/2019 | Gonzalez Garrido et al. |
| 10,587,498 | B2 | 3/2020 | Zee et al. |
| 10,719,489 | B1 | 7/2020 | Wu et al. |
| 11,611,604 | B2 | 3/2023 | Park et al. |
| 11,848,841 | B2 | 12/2023 | Zhang |
| 12,040,983 | B2 | 7/2024 | Yang et al. |
| 2012/0151009 | A1 | 6/2012 | Bouazizi et al. |
| 2012/0311126 | A1 * | 12/2012 | Jadallah .................. H04L 65/80 |
| | | | 709/224 |
| 2015/0334153 | A1 * | 11/2015 | Koster .................... H04L 65/65 |
| | | | 709/219 |
| 2016/0099849 | A1 * | 4/2016 | Batla ..................... H04L 67/535 |
| | | | 709/203 |
| 2018/0041913 | A1 * | 2/2018 | Zhu .......................... H04L 65/65 |
| 2018/0109587 | A1 * | 4/2018 | Spilka ................... H04L 65/613 |
| 2019/0327636 | A1 * | 10/2019 | Dao .................. H04W 28/0268 |
| 2020/0136991 | A1 * | 4/2020 | Salgueiro ........... H04L 41/0894 |
| 2020/0201534 | A1 | 6/2020 | Chen et al. |
| 2020/0260295 | A1 | 8/2020 | Escudero et al. |
| 2021/0344998 | A1 * | 11/2021 | Sodagar ................ H04L 65/765 |
| 2022/0021723 | A1 * | 1/2022 | Oyman ................... H04L 65/70 |
| 2022/0231932 | A1 * | 7/2022 | Zhang .................... H04L 65/61 |
| 2023/0164534 | A1 | 5/2023 | Muñoz De La Torre Alonso et al. |
| 2023/0199811 | A1 * | 6/2023 | Liang ................... H04W 72/51 |
| | | | 370/329 |
| 2023/0318951 | A1 * | 10/2023 | Szucs ..................... H04L 65/60 |
| | | | 709/224 |
| 2023/0319855 | A1 | 10/2023 | Park |

FOREIGN PATENT DOCUMENTS

| | | | |
|---|---|---|---|
| EP | 3991467 | B1 | 8/2023 |
| WO | 2019224574 | A1 | 11/2019 |
| WO | WO-2020001795 | A1 | 1/2020 |
| WO | 2022034281 | A1 | 2/2022 |

OTHER PUBLICATIONS

Ericsson LM: "Correction of 5GMSd AF-Based Network Assistance (Stage 2)," 3GPP TSG-SA4 Meeting #109-e, S4-200824, Electronic, the Internet, Jun. 3, 2020 (Jun. 3, 2020), 3 pages, the whole document.

International Search Report and Written Opinion—PCT/CN2020/109470—ISA/EPO—May 13, 2021.

Tencent: "Correction on Metrics Collection and Reporting," SA WG4 Meeting #109E (e-meeting), S4-200812, E-meeting, May 20-Jun. 3, 2020, (Jun. 3, 2020), 7 pages, sections 5.5.2-5.5.4.

BBC, et al., "Consolidated Changes from SA4#108-e Et Seq", 3GPP TSG-SA WG4 Meeting #109-e, S4-200707, Electronic, Internet, May 20-Jun. 3, 2020, 91 Pages.

BBC., et al., "Consolidated Changes from SA4#108-e and SA4#109-e", 3GPP TSG-SA WG4 Meeting #109-e, S4-200882, 3rd Generation Partnership Project, Mobile Competence Centre, 650, Route Des Lucioles, F-06921 Sophia-Antipolis Cedex, France, vol. SA WG4, No. Electronic; May 20, 2020-Jun. 3, 2020, Jun. 17, 2020, 5 Pages.

Ericsson LM., et al., "Correction of Architecture, Unicast Streaming Procedure, QoE metrics reporting, Consumption Reporting and Session Handling for 5GMS", 26501_CR0002R3_(Rel-16)_54-191075, 3GPP TSG-SA WG#4 Meeting #105, S4-191075, 3rd Generation Partnership Project, Mobile Competence Centre, 650, Route Des Lucioles, F-06921 Sophia-Antipolis Cedex, France, vol. TSG SA, No. Ljubljana, Slovenia, Aug. 12, 2019-Aug. 16, 2019, Sep. 2, 2019, 102 Pages.

Ericsson LM: "Stage 2 for Media Session Establishment, Interactions with Policy Control", 3GPP TSG-SA WG#4 Conf Call, S4-AH1840_5GMSA Stage2_Correction, 3rd Generation Partnership Project, Mobile Competence Centre, 650, Route Des Lucioles, F-06921 Sophia-Antipolis Cedex, France, vol. TSG SA, No. Conf Call, Sep. 11, 2019, Sep. 10, 2019, 24 Pages.

Supplementary European Search Report—EP20949704—Search Authority—Munich—Apr. 17, 2024.

Taiwan Search Report—TW110124518—TIPO—Oct. 8, 2024.

Tencent: "Correction on Metrics Collection and Reporting", SA WG4 Meeting 109E (e-meeting), S4-200812, E-meeting, May 20, 2020-Jun. 3, 2020, Jun. 3, 2020, Sec 5.

3GPP TR 26.909: "3rd Generation Partnership Project, Technical Specification Group Services and System Aspects, Study on improved streaming Quality of Experience (QoE) reporting in 3GPP services and networks (Release 15)", 3GPP TR 26.909 V15.0.0, Jun. 2018, pp. 1-31.

3GPP TS 26.501: "3rd Generation Partnership Project, Technical Specification Group Services and System Aspects, 5G Media Streaming (5GMS), General description and architecture (Release 16)", Jul. 20, 2020, 3GPP TS 26.501 V16.4.1, Jun. 2020, 75 Pages.

3GPP TS 26.512: "3rd Generation Partnership Project, Technical Specification Group Services and System Aspects, 5G Media Streaming (5GMS), Protocols (Release 16)", 3GPP TS 26.512 V1.3.0, Aug. 2020, pp. 1-52.

Ericsson LM: "Metrics Collection and Reporting", 3GPP TSG-SA4 Meeting #103, S4-190363, Newport Beach, CA, US, Apr. 8-12, 2019, Apr. 2, 2019, 5 Pages.

U.S. Appl. No. 63/064,815, Specification filed on Aug. 12, 2020, pp. 1-57.

\* cited by examiner

500

501

Determine One Or More Metrics Reporting Requirements Associated With A 5G Media Streaming Service

502

Send Metrics Configuration Message To Wireless Device Via Control Plane Based M5 Interface Included In 5GS Network

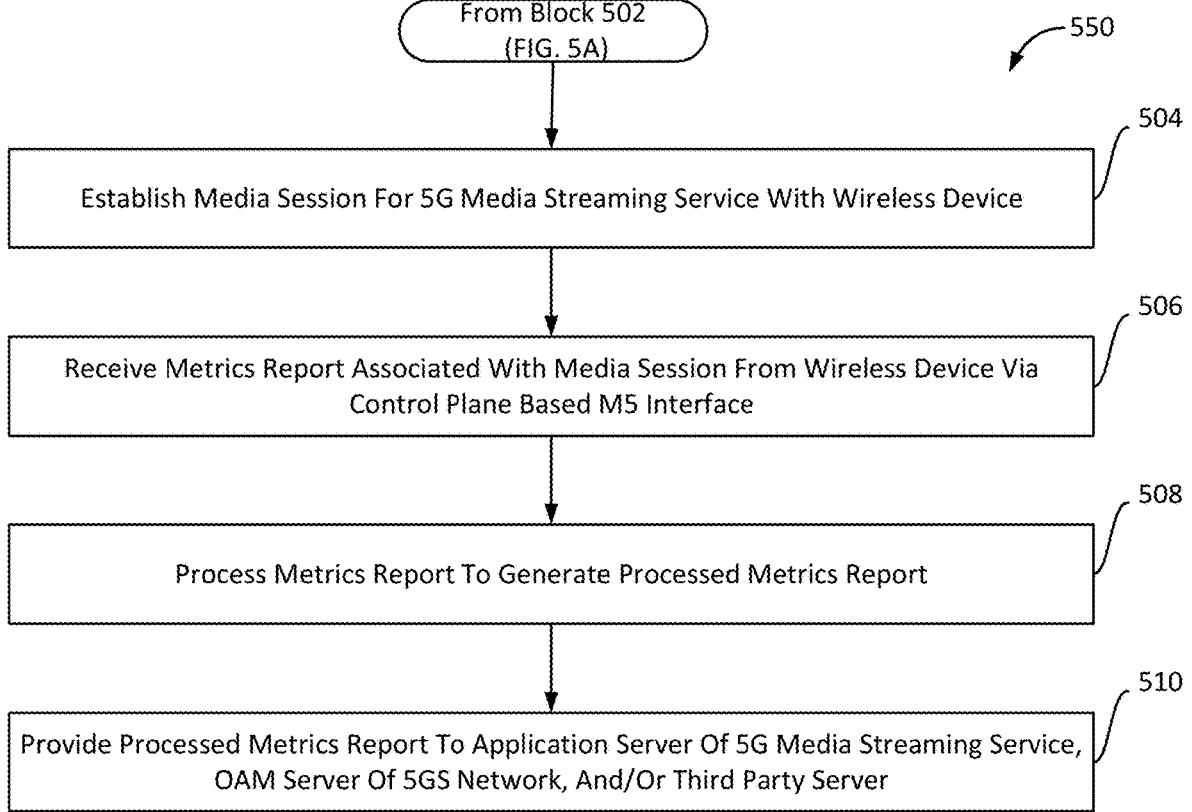

From Block 502
(FIG. 5A)

550

504

Establish Media Session For 5G Media Streaming Service With Wireless Device

506

Receive Metrics Report Associated With Media Session From Wireless Device Via Control Plane Based M5 Interface

508

Process Metrics Report To Generate Processed Metrics Report

510

Provide Processed Metrics Report To Application Server Of 5G Media Streaming Service, OAM Server Of 5GS Network, And/Or Third Party Server

FIG. 5B

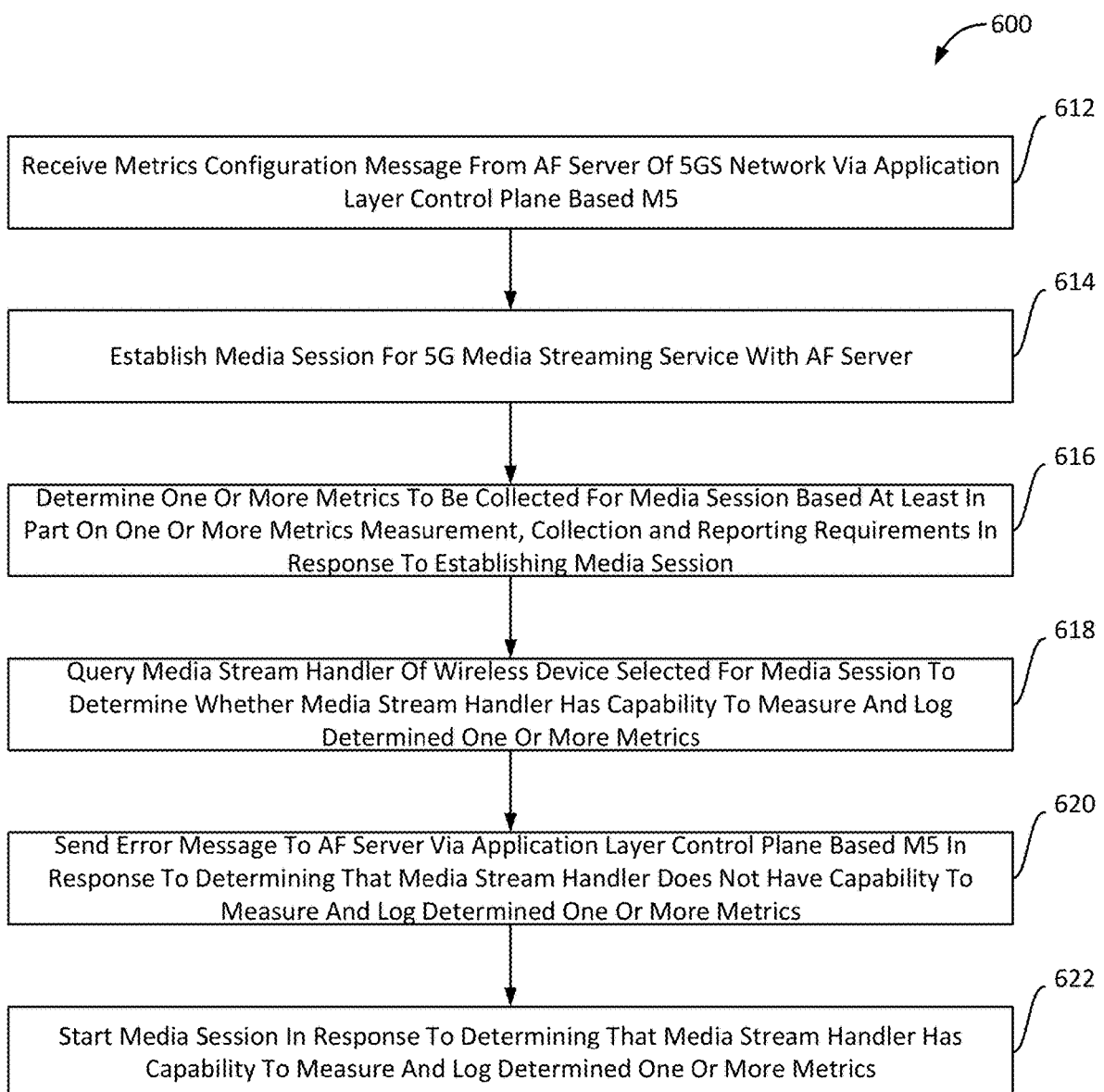

600

612
Receive Metrics Configuration Message From AF Server Of 5GS Network Via Application Layer Control Plane Based M5

614
Establish Media Session For 5G Media Streaming Service With AF Server

616
Determine One Or More Metrics To Be Collected For Media Session Based At Least In Part On One Or More Metrics Measurement, Collection and Reporting Requirements In Response To Establishing Media Session 618
Query Media Stream Handler Of Wireless Device Selected For Media Session To Determine Whether Media Stream Handler Has Capability To Measure And Log Determined One Or More Metrics 620
Send Error Message To AF Server Via Application Layer Control Plane Based M5 In Response To Determining That Media Stream Handler Does Not Have Capability To Measure And Log Determined One Or More Metrics 622
Start Media Session In Response To Determining That Media Stream Handler Has Capability To Measure And Log Determined One Or More Metrics

FIG. 6A

From Block 622
(FIG. 6A)

650

624

Receive Collected Metrics From Media Stream Handler After Start Of Media Session

626

Aggregate Collected Metrics According To Metrics Scheme To Generate Metrics Report Associated With Media Session

628

Send Metrics Report Associated With Media Session To AF Server Via Application Layer Control Plane Based M5

METRICS COLLECTION AND REPORTING IN 5G MEDIA STREAMING

RELATED APPLICATIONS

This application is a national stage application of and claims the benefit of priority to PCT application PCT/CN2020/109470 entitled "Metrics Collection And Reporting In 5G Media Streaming" filed Aug. 17, 2020, the entire contents of which are hereby incorporated by reference for all purposes.

BACKGROUND

Long Term Evolution (LTE), Fifth Generation (5G) new radio (NR)(5GNR), and other recently developed communication technologies allow wireless devices to communicate information at data rates (e.g., in terms of Gigabits per second, etc.) that are orders of magnitude greater than what was available just a few years ago. Today's communication networks are also more secure, resilient to multipath fading, allow for lower network traffic latencies, and provide better communication efficiencies (e.g., in terms of bits per second per unit of bandwidth used, etc.). These and other recent improvements have facilitated the emergence of new ways to deliver media and content to mobile wireless devices, including broadcast, multicast and unicast media delivery technologies.

SUMMARY

Various aspects include methods for supporting metrics measurement, collection and reporting for Fifth Generation (5G) Media Streaming in a 5G system (5GS) network. Various aspects may be performed by a processor of an application function (AF) server of a 5GS network. Various aspects may be performed by a Media Session Handler running on a processor of a wireless device connected to a radio access network (RAN) of a system (5GS) network. Various aspects may include, for a downlink 5G Media Streaming service, sending a metrics configuration message to a wireless device via an application layer control plane based M5d interface included in the 5GS network, wherein the metrics configuration message indicates one or more metrics measurement, collection and reporting requirements associated with a 5G Media Streaming service. Various aspects may include, for uplink 5G Media Streaming, sending a metrics configuration message to a wireless device via an application layer control plane based M5u interface included in the 5GS network, wherein the metrics configuration message indicates one or more metrics measurement, collection and reporting requirements associated with uplink 5G Media Streaming.

Various aspects may include sending a metrics configuration message to a wireless device via a control plane based M5 interface included in the 5GS network, wherein the metrics configuration message indicates one or more metrics measurement, collection and reporting requirements associated with a 5G Media Streaming service.

Various aspects may further include establishing a media session for the 5G Media Streaming service with the wireless device, receiving a metrics report associated with the media session from the wireless device via the control plane based M5d interface, wherein the metrics report includes collected metrics associated with the one or more metrics measurement, collection and reporting requirements, processing the metrics report to generate a processed metrics report, and providing the processed metrics report to an application server of the 5G Media Streaming service, an Operations, Administration and Maintenance (OAM) server of the 5GS network, and/or a third-party server.

In some aspects, processing the metrics report to generate the processed metrics report may include filtering, aggregating, and/or reformatting the collected metrics. In some aspects, processing the metrics report to generate the processed metrics report may include processing the metrics report to generate the processed metrics report according to one or more rules indicated by the application server of the 5G Media Streaming service, an OAM server of the 5GS network, and/or a third-party server. In some aspects, the one or more metrics measurement, collection and reporting requirements may include Quality of Experience (QoE) metrics associated with applications or content services provisioned from outside the 5GS network to the 5GS network, and/or metrics requested from outside the 5GS network. In some aspects, the metrics configuration message further indicates a metrics scheme. In some aspects, the metrics scheme may be based on settings of the 5GS network and/or metrics scheme settings received from outside the 5GS network. In some aspects, the metrics scheme defines metrics measurement, collection and reporting rules and procedures. In some aspects, the one or more metrics measurement, collection and reporting requirements include non-Third Generation Partnership Protocol (non-3GPP) metrics. In some aspects, the 5G Media Streaming service may be an uplink 5G Media Streaming service or a downlink 5G Media Streaming service.

Various aspects may include, receiving a metrics configuration message from an AF server of the 5GS network via an application layer control plane based M5 interface, wherein the metrics configuration message indicates one or more metrics measurement, collection and reporting requirements associated with a 5G Media Streaming service, establishing a media session for the 5G Media Streaming service with the AF server, determining one or more metrics to be collected for the media session based at least in part on the one or more metrics measurement, collection and reporting requirements in response to establishing the media session, starting the media session, collecting metrics from a Media Stream Handler after the start of the media session, aggregating the collected metrics according to a metrics scheme to generate a metrics report associated with the media session, and sending the metrics report associated with the media session to the AF server via the application layer control plane based M5 interface.

Some aspects may further include querying the Media Stream Handler of the wireless device selected for the media session to determine whether the Media Stream Handler has a capability to measure and log the determined one or more metrics, and sending an error message to the AF server via the application layer control plane based M5 interface in response to determining that the Media Stream Handler does not have the capability to measure and log the determined one or more metrics. In some aspects, starting the media session may include starting the media session in response to determining that Media Stream Handler has the capability to measure and log the determined one or more metrics.

In some aspects, the metrics configuration message indicates the metrics scheme. In some aspects, collection of the logged metrics measurements by the Media Stream Handler after the start of the media session may include sending periodic requests for the collection of logged metrics measurements by the Media Stream Handler after the start of the media session according to the metrics scheme; and receiving responses from the Media Stream Handler including the measured metrics. In some aspects, the Media Stream Handler may be a Media Player for a downlink 5G Media Streaming service. In some aspects, the Media Stream Handler may be a Media Streamer for an uplink 5G Media Streaming service.

In some aspects, the metrics scheme may define a periodic request triggering condition. In some aspects, the periodic request triggering condition may be an interval timer expiration, a streamed content amount threshold being reached, or an occurrence of a specified event. In some aspects, sending the metrics report associated with the media session to the AF server via the application layer control plane based M5 interface may include sending the metrics report associated with the media session to the AF server via the application layer control plane based M5 interface according to the metrics scheme. In some aspects, the metrics scheme defines a metrics reporting rule defining when to send the metrics report. In some aspects, the metrics reporting rule indicates a periodicity for sending the metric report. In some aspects, receiving collected metrics from the Media Stream Handler may include receiving collected metrics from the Media Stream Handler via the M7 interface between the Media Stream Handler and the Media Session Handler. In some aspects, receiving the collected metrics from the Media Stream Handler after the start of playout of the content for the media session comprises receiving the collected metrics from the Media Stream Handler after the start of playout of the content for the media session according to a first metrics scheme and a second metrics scheme.

In some aspects, sending the metrics report associated with the media session to the AF server via the application layer control plane based M5 interface may include sending a first metrics report associated with the media session to the AF server via the application layer control plane based M5 interface, wherein the first metrics report includes collected metrics according to the first metrics scheme, and sending a second metrics report associated with the media session to another AF server via the application layer control plane based M5 interface, wherein the second metrics report includes collected metrics according to the second metrics scheme. In some aspects, the one or more metrics measurement, collection and reporting requirements may include Quality of Experience (QoE) metrics associated with applications or content services provisioned from outside the 5GS network to the 5GS network, or metrics requested from outside the 5GS network. In some aspects, the one or more metrics measurement, collection and reporting requirements include non-Third Generation Partnership Protocol (non-3GPP) metrics.

Further aspects may include a wireless device having a processor configured to perform one or more operations of the methods summarized above. Further aspects may include a non-transitory processor-readable storage medium having stored thereon processor-executable instructions configured to cause a processor of a wireless device to perform operations of the methods summarized above. Further aspects include a wireless device having means for performing functions of the methods summarized above. Further aspects include a system on chip for use in a wireless device that includes a processor configured to perform one or more operations of the methods summarized above. Further aspects include a system in a package that includes two systems on chip for use in a wireless device that includes a processor configured to perform one or more operations of the methods summarized above. Further aspects may include a network computing device having a processor configured to perform one or more operations of the methods summarized above. Further aspects may include a non-transitory processor-readable storage medium having stored thereon processor-executable instructions configured to cause a processor of a network computing device to perform operations of the methods summarized above. Further aspects include a network computing device having means for performing functions of the methods summarized above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

FIG. 5B is a process flow diagram illustrating a method for supporting metrics collection and reporting for 5G Media Streaming in a 5GS network in accordance with various embodiments.

FIG. 6A is a process flow diagram illustrating a method for supporting metrics collection and reporting for 5G Media Streaming in a 5GS network in accordance with various embodiments.

DETAILED DESCRIPTION

Figure 1:
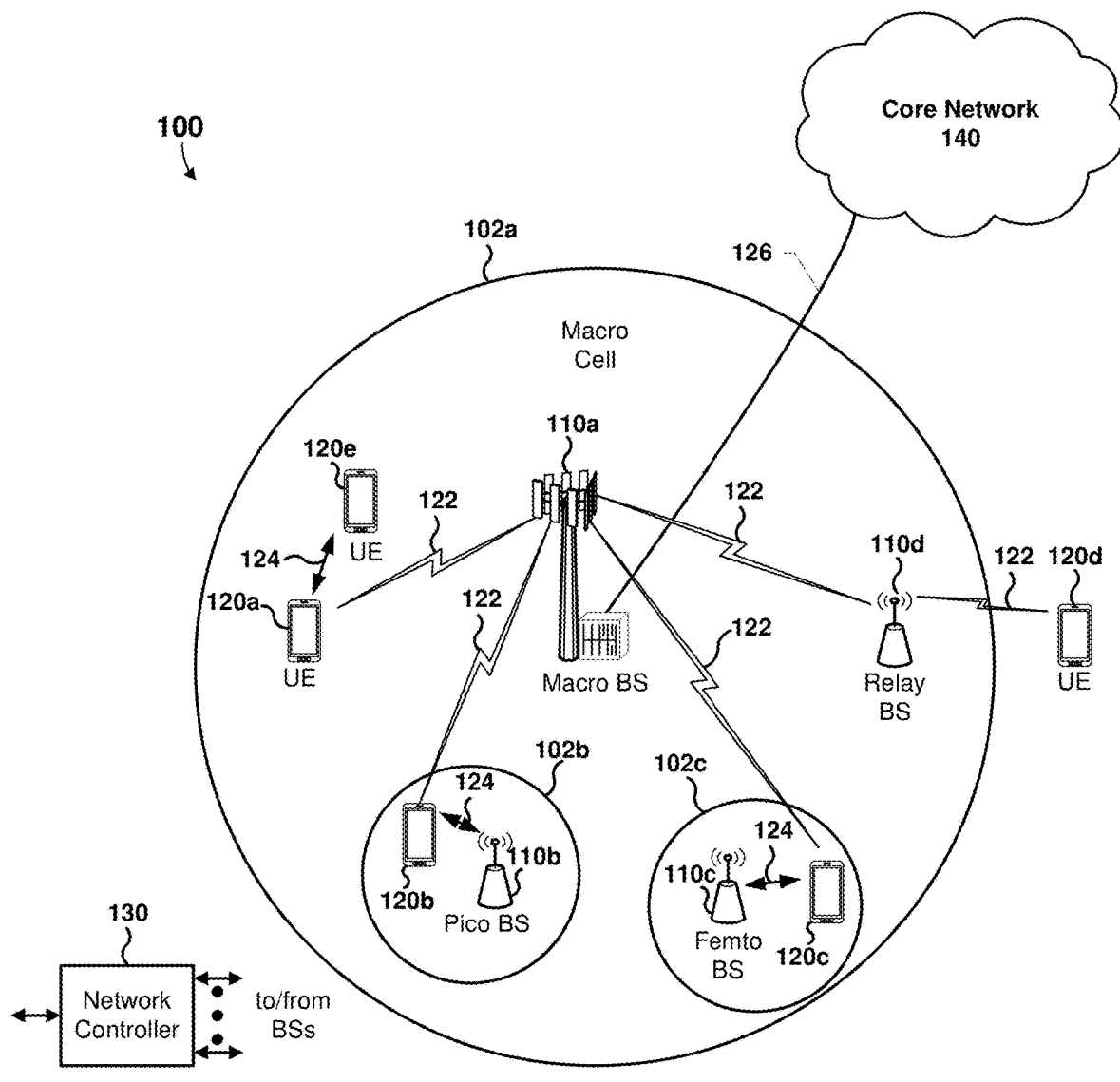
FIG. 1 is a system block diagram illustrating an example communication system suitable for implementing any of the various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include systems and methods for metrics collection and reporting in Fifth Generation (5G) Media Streaming. Metrics collection and reporting, such as Quality of Experience (QoE) metrics collection and reporting, for 5G Media Streaming currently does not support message flows for control-centric streaming functions enabling metrics reporting between a Media Session Handler running on a processor of a wireless device and an Application Function (AF) in a 5G system (5GS) network architecture. Additionally, the metrics reporting framework for 5G Media Streaming currently does not provide support for third-party defined schemes of metrics configuration, collection, and reporting functionality. Various embodiments include systems and methods enabling a Media Session Handler running on a processor of a wireless device to acquire a metrics configuration message from an AF server of the 5GS network via an application layer control plane based M5 interface, which may be a Representational State Transfer (REST)-ful (RESTful) Applicant Programming Interface (API) exposed by the AF server, and wherein the metrics configuration message indicates one or more metrics measurement, collection and reporting requirements associated with a 5G Media Streaming service and to send a metrics report associated with the media session to the AF server via the M5 interface. By supporting metrics collection and reporting by a Media Session Handler over the M5 interface, various embodiments may provide for third-party defined schemes of metrics measurement, collection, and reporting in a 5GS network.

The term "wireless device" is used herein to refer to any one or all of wireless router devices, wireless appliances, cellular telephones, smartphones, portable computing devices, personal or mobile multi-media players, laptop computers, tablet computers, smartbooks, ultrabooks, palm-top computers, wireless electronic mail receivers, multime-dia Internet-enabled cellular telephones, medical devices and equipment, biometric sensors/devices, wearable devices including smart watches, smart clothing, smart glasses, smart wrist bands, smart jewelry (e.g., smart rings, smart bracelets, etc.), entertainment devices (e.g., wireless gaming controllers, music and video players, satellite radios, etc.), wireless-network enabled Internet of Things (IoT) devices including smart meters/sensors, industrial manufacturing equipment, large and small machinery and appliances for home or enterprise use, wireless communication elements within autonomous and semiautonomous vehicles, wireless devices affixed to or incorporated into various mobile plat-forms, global positioning system devices, and similar elec-tronic devices that include a memory, wireless communica-tion components and a programmable processor.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, volt-age regulators, oscillators, etc.). SOCs may also include software for controlling the integrated resources and pro-cessors, as well as for controlling peripheral devices.

The term "system in a package" (SIP) may be used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical con-figuration. Similarly, the SIP may include one or more multi-chip modules (MCMs) on which multiple ICs or semiconductor dies are packaged into a unifying substrate. An SIP may also include multiple independent SOCs coupled together via high speed communication circuitry and packaged in close proximity, such as on a single motherboard or in a single wireless device. The proximity of the SOCs facilitates high speed communications and the sharing of memory and resources.

The term "multicore processor" may be used herein to refer to a single integrated circuit (IC) chip or chip package that contains two or more independent processing cores (e.g., CPU core, Internet protocol (IP) core, graphics pro-cessor unit (GPU) core, etc.) configured to read and execute program instructions. A SOC may include multiple multi-core processors, and each processor in an SOC may be referred to as a core. The term "multiprocessor" may be used herein to refer to a system or device that includes two or more processing units configured to read and execute pro-gram instructions.

As used herein, the terms "SIM," "SIM card," and "sub-scriber identity module" may interchangeably refer to a memory that may be an integrated circuit or embedded into a removable card, and that stores an International Mobile Subscriber Identity (IMSI), related key, and/or other infor-mation used to identify and/or authenticate a wireless device on a network and enable a communication service with the network. Examples of SIMs include the Universal Sub-scriber Identity Module (USIM) provided for in the Long Term Evolution (LTE) 3GPP standard, and the Removable User Identity Module (R-UIM) provided for in the 3GPP standard. Universal Integrated Circuit Card (UICC) is another term for SIM. Moreover, a SIM may also refer to a virtual SIM (VSIM), which may be implemented as a remote SIM profile loaded in an application on a wireless device, and enabling normal SIM functions on the wireless device.

Because the information stored in a SIM enables the wireless device to establish a communication link for a particular communication service or services with a particu-lar network, the term "SIM" is also be used herein as a shorthand reference to the communication service associ-ated with and enabled by the information stored in a par-ticular SIM as the SIM and the communication network, as well as the services and subscriptions supported by that network, correlate to one another. Similarly, the term SIM may also be used as a shorthand reference to the protocol stack and/or modem stack and communication processes used in establishing and conducting communication services with subscriptions and networks enabled by the information stored in a particular SIM.

As used herein, the terms "multi-SIM wireless device", "MS wireless device", "dual-SIM wireless device", and "DS wireless device" may interchangeably describe a wireless device that is configured with more than one SIM. Examples of multi-SIM wireless devices include multi-SIM multi-standby (MSMS) wireless devices, such as Dual-SIM (DS) dual-standby (DSDS) wireless devices, etc., and multi-SIM multi-active (MSMA) wireless devices, such as Dual-SIM dual-active (DSDA) wireless devices, etc. An MSMS wire-less device may be a wireless device that is configured with more than one SIM and allows idle-mode operations to be performed on two subscriptions simultaneously, as well as selective communication on one subscription while performing idle-mode operations on at least one other subscription. An MSMA wireless device may be a wireless device that is configured with more than one SIM and allows idle-mode and/or active mode operations to be performed on two subscriptions simultaneously using at least two different radio frequency (RF) resources (e.g., two different wireless transceivers).

The various embodiments are described herein using the term "server" to refer to any computing device capable of functioning as a server, such as a master exchange server, web server, mail server, document server, content server, or any other type of server. A server may be a dedicated computing device or a computing device including a server module (e.g., running an application that may cause the computing device to operate as a server). A server module (e.g., server application) may be a full function server module, or a light or secondary server module (e.g., light or secondary server application) that is configured to provide synchronization services among the dynamic databases on receiver devices. A light server or secondary server may be a slimmed-down version of server-type functionality that can be implemented on a receiver device thereby enabling it to function as an Internet server (e.g., an enterprise e-mail server) only to the extent necessary to provide the functionality described herein.

As used herein, the terms "network," "system," "wireless network," "cellular network," and "wireless communication network" may interchangeably refer to a portion or all of a wireless network of a carrier associated with a wireless device and/or subscription on a wireless device. The techniques described herein may be used for various wireless communication networks, such as Code Division Multiple Access (CDMA), time division multiple access (TDMA), FDMA, orthogonal FDMA (OFDMA), single carrier FDMA (SC-FDMA) and other networks. In general, any number of wireless networks may be deployed in a given geographic area. Each wireless network may support at least one radio access technology, which may operate on one or more frequency or range of frequencies. For example, a CDMA network may implement Universal Terrestrial Radio Access (UTRA) (including Wideband Code Division Multiple Access (WCDMA) standards), CDMA2000 (including IS-2000, IS-95 and/or IS-856 standards), etc. In another example, a TDMA network may implement GSM Enhanced Data rates for GSM Evolution (EDGE). In another example, an OFDMA network may implement Evolved UTRA (E-UTRA) (including LTE standards), IEEE 802.11 (WiFi), IEEE 802.16 (WiMAX), IEEE 802.20, Flash-OFDM®, etc. Reference may be made to wireless networks that use LTE standards, and therefore the terms "Evolved Universal Terrestrial Radio Access," "E-UTRAN" and "eNodeB" may also be used interchangeably herein to refer to a wireless network. However, such references are provided merely as examples, and are not intended to exclude wireless networks that use other communication standards. For example, while various Third Generation (3G) systems, Fourth Generation (4G) systems, and Fifth Generation (5G) systems are discussed herein, those systems are referenced merely as examples and future generation systems (e.g., sixth generation (6G) or higher systems) may be substituted in the various examples.

The terms "network operator," "operator," "mobile network operator," "carrier," and "service provider" are used interchangeably herein to describe a provider of wireless communications services that owns or controls elements to sell and deliver communication services to an end user, and provides necessary provisioning and credentials as policies implemented in user device subscriptions.

As used herein, the term "RF resource" refers to the components in a communication device that send, receive, and decode radio frequency signals. An RF resource typically includes a number of components coupled together that transmit RF signals that are referred to as a "transmit chain," and a number of components coupled together that receive and process RF signals that are referred to as a "receive chain."

LTE is a mobile network standard for 4G wireless communication of high-speed data developed by the 3GPP (3rd Generation Partnership Project) and specified in its Release 8 document series. The 5G system (5GS) is an advanced technology from 4G LTE, and provides a new radio access technology (RAT) through the evolution of the existing mobile communication network structure. Implementations for 5GS networks are currently being adopted that provide new radio (NR) (also referred to as 5G) support via NR base stations, such as Next Generation NodeB (gNodeBs or gNBs)). The 5G systems and NR base stations are providing flexibility in bandwidth scheduling and utilization. Future generation systems (e.g., sixth generation (6G) or higher systems) may provide the same or similar flexibility in bandwidth scheduling and utilization.

In LTE and/or 5G (or later generation) systems network devices, such as base stations, may broadcast packets to wireless devices in a cell. For ease of reference, the term "network device" or "network computing device" is used to refer to any of a variety of network elements that may perform operations of various embodiments, non-limiting examples of which include a base station, an eNodeB, a gNodeB, an Applicant Function (AF) server, Operations, Administration and Maintenance (OAM) server, applicant server, etc.

5G Media Streaming (also referred to as 5GMS) is designed such that, in particular, third-party services can be distributed using a 5GS network in order to make best use of 5G features. However, 3GPP specifications currently lack an adequate framework to support QoE metrics measurement, collection and reporting for third-party applications and content services, such as video streaming services, etc., and third-party metrics, such as defined by commercial metrics services, etc. QoE metrics measurement, collection and reporting as currently described for 3GPP does not include a message flow reflecting the general 5G Media Streaming (5G Media Streaming) architecture on control-centric streaming functions whereby metrics reporting occurs between the Media Session Handler and the 5G Media Streaming AF. Additionally, the metrics reporting framework as currently described for 3GPP lacks support for third-party (e.g., non-3GPP metrics) defined metrics schemes and associated configuration rules on metrics measurement, collection and reporting functionality. As used herein, non-3GPP and/or third-party may refer to entities, metrics, and/or operations outside the requirements of 3GPP. An example of a 3GPP entity may be a mobile network operator (MNO), while a third-party entity may be an application provider, such as a Media Streaming service provider (e.g., Netflix®, Facebook Live®, etc.). Examples of non-3GPP entities specifying their own QoE metrics and associated collection and reporting mechanisms which likely differ from those defined by 3GPP may include third-party application service providers and external industry for or standards development organizations (SDOs). For example, the Consumer Technology Association (CTA) has defined a standard in CTA-2066 regarding streaming content related QoE events, properties and metrics, targeted for use by media player, metrics aggregator/reporter, and analytics vendors and implementers. Such CTA-2066 defined metrics may be non-3GPP metrics. As another example, Moving Picture Experts Group (MPEG) standards may define metrics related to media playout that may be non-3GPP metrics.

Various embodiments may enable 5G Media Streaming technical solutions that properly reflect the 5G Media Streaming reference architecture, and support streaming services offered by both mobile operators (e.g., MNOs) and third-party application service providers. Various embodiments may enable metrics measurement, collection and reporting that comply with the interaction model between functional entities as indicated in the 5G Media Streaming architecture, as well as provide adequate support to third party-defined schemes on metrics measurement, collection and reporting mechanisms. Additionally, various embodiments may provide metrics visibility to MNOs of non-3GPP metrics in a Network Data Analytics Function (NWDAF) to enable data collection and exposure of 3GPP metrics and/or non-3GPP metrics.

In various embodiments, information on metrics measurement, collection and reporting, may include the configuration rules of a metrics scheme which is 3GPP and/or third party-defined (e.g., non-3GPP), may be sent over the M5 interface from an Application Function (AF) to a Media Session Handler (also referred to as a MSH) running on a processor of a wireless device. The collection and reporting related rules may be configured for use by the Media Session Handler, whereas the measurement related rules may be configured for use by a Media Stream Handler. A Media Stream Handler may be implemented as a Media Player for a downlink streaming service and/or may be implemented as a Media Streamer for an uplink streaming service. In various embodiments, 3GPP and/or third party-defined configuration rules on metrics measurement associated with the metrics scheme may be exposed by the Media Session Handler to the Media Player (also referred to as a MP) in downlink streaming or to the Media Streamer (also referred to as an MS) via a player Application Programming Interface (API) (e.g., via the M7 interface, where M7d refers to the downlink streaming interface and M7u refers to the uplink streaming interface). Metrics specified in the measurement rules and accessible to the MP or the MS may then be measured and logged by the MP or the MS. In various embodiments, the logged metrics measurements by the Media Player or the Media Streamer may be exposed to and collected by the Media Session Handler over the M7d or the M7u interface, respectively, via the API exposed by the Media Session Handler (e.g., event and/or query-based). In various embodiments, the Media Session Handler in accordance to the reporting rule defined by the metrics scheme may use the information on the M7d or the M7u interface to send metrics reports as derived from aggregation and/or filtering of the collected metrics logs (e.g., periodically at defined intervals, by specified percentage of streaming sessions, based on specific events, etc.) to the AF through the M5d or the M5u interface (M5d refers to downlink streaming and M5u refers to uplink streaming). In various embodiments, the AF may perform additional processing of the received metrics data (e.g., filtering, reformatting, and/or aggregation). In various embodiments, the AF may subsequently deliver the processed metrics report to one or more client network entities, such as a 3GPP OAM server, third-party application provider's application server, and/or another third-party server, etc.

In various embodiments, there may be different schemes of metrics that the media player may collect. These may include 3GPP-defined metrics, other standardized metrics, such as MPEG, CTA 2066, etc., and proprietary metrics, defined by vendors. In various embodiments, metrics measurements by the Media Player/Media Streamer may be done according to different metrics schemes at the same time to support multiple use cases (e.g., different sets of measured metrics depending on the metrics scheme). In various embodiments, metrics collection and reporting by the Media Session Handler may be done according to different metrics schemes at the same time and/or to different AFs, for example one to the MNO and another to the service provider. In various embodiments, the Media Session Handler may use well-defined metrics and their measurements provided by the Media Player (e.g., log metrics as defined in MPEG) and may convert those to a 3GPP-defined format. In various embodiments, the Media Session Handler may use other status information from the Media Player or the Media Streamer to generate derived metrics reports sent to one or more AFs. In various embodiments, the Media Session Handler may be configured to verify Media Player or Media Streamer support for the specific metrics and their required measurement rules, for example as defined by the metrics scheme. In various embodiments, the application provider application server, OAM server, and/or other third-party server as recipients of metric reports from the AF may define their own respective post-processing rules (e.g., filtering, aggregation, re-formatting), on the reports received by the AF from the Media Session Handler, to be performed by the AF in generating those processed metric reports. In this manner, the AF processing of the metrics reports from the Media Session Handler to generate processed metrics reports may be performed according to rules and/or operations configured by the application provider application server, OAM server, and/or third-party server.

Various embodiments may enable metrics configuration on measurement and collection interactions between a Media Session Handler and a Media Player or a Media Streamer. Various embodiments may enable an indication of a metric scheme as new component of metric configuration parameters. Various embodiments may include a "Scheme" as a parameter for identifying 3GPP and/or third party defined metrics schemes (e.g., non-3GPP metrics schemes). Various embodiments may include extending the definition of "Metrics" to include support for non-3GPP defined metrics parameters.

In various embodiments, when the metrics measurement, collection and reporting feature is activated for a downlink or uplink streaming session, one or more parameters in the parameter set, such as a "Scheme" parameter and/or a "Metric" parameter may be present in the metrics configuration.

In various embodiments, a "Scheme" parameter may indicate the scheme associated with the metrics configuration which defines the rules of metrics measurement, collection and reporting. The scheme may be associated with a 3GPP entity and/or with a non-3GPP entity. If not specified, the 3GPP metrics scheme may apply. As one example, schemes may be identified by Uniform Resource Indicators (URIs) (e.g., of the form urn:xyz:scheme:metrics-config, where 'xyz' identifies the entity defining the metrics configuration).

In various embodiments, a "Scheme" parameter may indicate one or more schemes associated with the metrics configuration, each of which defines its own rules on metrics measurement, collection and reporting. A scheme may be associated with a 3GPP entity and/or with a non-3GPP entity. If not specified, the 3GPP metrics scheme may apply. Schemes may be identified by URIs (e.g., of the form urn:xyz:scheme:metrics-config, where 'xyz' identifies the entity defining the metrics configuration). In various embodiments, the presence of multiple schemes in the metrics configuration may indicate that different sets of measured and collected metrics may be made available for the corresponding generation and sending of different metrics report by the 5GMS wireless device to the 5GMS AF. A downlink 5GMS wireless device may be referred to as a 5GMSd wireless device and an uplink 5GMS wireless device may be referred to as a 5GMSu wireless device. A downlink 5GMS AF may be referred to as a 5GMSd AF and an uplink 5GMS AF may be referred to as a 5GMSu AF. In various embodiments, each set of collected metrics and corresponding report may be bound to a specific metrics scheme.

In various embodiments, a "Metric" parameter may indicate a list of metrics, as defined by the metrics configuration of the associated scheme, which may be collected by the Media Player or the Media Streamer and reported by the Media Session Handler. As an example, the 3GPP metrics scheme may correspond to one or more of the metrics for progressive download and DASH (Dynamic Adaptive Streaming over HTTP (Hyptertext Transfer Protocol)) streaming services, respectively. As an example, non-3GPP metrics schemes may correspond to one or more of the metrics defined by a third party application and content service provider.

In various embodiments, a "Metric" parameter may indicate a list of metrics, as defined by the metrics configuration of the associated scheme, which may be measured by the Media Player or the Media Streamer and collected by the Media Session Handler for subsequent upstream metrics reporting. For progressive download and DASH streaming services, the 3GPP metrics scheme may correspond to one or more of the metrics, respectively.

Various embodiments may provide an AF controlled metrics reporting procedure. In some embodiments, an AF controlled metrics reporting procedure may include scenarios in which metrics reports from the 5GMS wireless device may be initially sent to the 5GMS AF (5GMSd AF or 5GMSu AF, depending on the direction of the streaming service). Metrics to be collected and reported are defined by 3GPP and/or by a third-party entity (e.g., non-3GPP) in accordance to the metrics configuration scheme. In some embodiments, the OAM Server role may be implemented by the NWDAF (Network Data Analytics Function).

In some embodiments, an AF controlled metrics reporting procedure may include scenarios in which metrics reports from the 5GMS wireless device may be sent to the 5GMS AF. In various embodiments, the metrics configuration provisioned to the 5GMS AF may include instructions and/or rules on metrics measurement, collection and reporting for two different schemes, such as one defined and provisioned by the third party application provider, and the other scheme defined by 3GPP and provisioned by the OAM Server (e.g., by a NWDAF entity). In some embodiments, each metrics scheme may require the Media Player or the Media Streamer to perform its own metrics measurement, and require the Media Session Handler to perform its own metrics collection and reporting, such as separate collection procedures within the Media Session Handler and separate sending of metrics reports by the Media Session Handler to the 5GMS AF. In some embodiments, the 5GMS AF may perform separate procedures on post-processing of each type of metrics report it receives from the Media Session Handler and subsequent sending of the processed reports to the appropriate destination servers, in accordance to the metrics scheme (e.g., to a third-party application provider server for the third-party metrics scheme and the OAM Server for the 3GPP metrics scheme).

In various embodiments, metrics measurement and collection configuration parameters and reporting operations may include indicating the server address parameter for AF controlled metrics reporting. In various embodiments, metrics measurement and collection configuration parameters and reporting operations may include indicating the scheme parameter for AF controlled metrics reporting. In various embodiments, metrics measurement and collection configuration parameters and reporting operations may include indicating the data network name (DNN) parameter for AF controlled metrics reporting. In various embodiments, metrics measurement and collection configuration parameters and reporting operations may include indicating the reporting interval parameter for AF controlled metrics reporting. In various embodiments, metrics measurement and collection configuration parameters and reporting operations may include indicating the sample percentage parameter (proportion of streaming sessions to be reported) for AF controlled metrics reporting. In various embodiments, metrics measurement and collection configuration parameters and reporting operations may not include an indication of a streaming source filter parameter for AF controlled metrics reporting. In various embodiments, metrics measurement and collection configuration parameters and reporting operations may include indicating the metrics parameter for AF controlled metrics reporting, such as 3GPP defined metrics and/or non-3GPP defined metrics.

In various embodiments, metrics schemes and associated functionality, including configuration rules on metrics measurement, collection and reporting may be enabled for downlink and/or uplink 5G Media Streaming services. In the 5GMS architectures and functional entities, a media plane entity in a wireless device, applicable to both DL (downlink) and UL (uplink) streaming may be generically referred to as the "Media Stream Handler". The Media Stream Handler entity may be implemented as a Media Player for DL streaming and as a Media Streamer in UL streaming. Various embodiments may provide metrics functionality independent of streaming direction. Thus, while certain examples herein may be discussed in terms of a specific streaming direction, such as DL or UL, the discussions of a streaming direction are used merely as examples, and DL streaming directions may be substituted with UL steaming directions, and vice versa, as the concepts and functionality are equally applicable to UL streaming. As specific examples, interfaces M5u and M5d may be substituted for one another, interfaces M7u and M7d may be substituted for one another, a Media Player and Media Streamer may be substituted for one another, and a 5GMSu AF and 5GMSd AF may be substituted for one another.

In various embodiments, metrics configuration associated with a given metrics scheme may specify three functions regarding metrics: 1) measurement (and associated logging), for example by the Media Player; 2) collection of logged measurements from the Media Player by the Media Session Handler; and 3) generation and sending of metrics reports by the Media Session Handler to the AF.

Various interfaces are discussed herein, such as an M5 interface (e.g., M5d, M5u). The M5 interface (whether referred to for the downlink direction as M5d or the uplink direction as M5u) is an application layer control plane interface, and in stage 3 of the three-stage methodology for describing 3GPP services (e.g., the switching and signaling capabilities needed to support a service), the M5 interface may be realized as a RESTful API exposed by the AF to a Media Session Handler running on a processor of a wireless device.

FIG. 1 is a system block diagram illustrating an example communication system 100 suitable for implementing any of the various embodiments. The communications system 100 may be a 5G New Radio (NR) network, or any other suitable network such as a Long Term Evolution (LTE) network.

The communications system 100 may include a heterogeneous network architecture that includes a core network 140 and a variety of mobile devices (illustrated as wireless device 120a-120e in FIG. 1). The communications system 100 may also include a number of base stations (illustrated as the BS 110a, the BS 110b, the BS 110c, and the BS 110d) and other network entities. A base station is an entity that communicates with wireless devices (mobile devices), and also may be referred to as an NodeB, a Node B, an LTE evolved nodeB (eNB), an access point (AP), a radio head, a transmit receive point (TRP), a New Radio base station (NR BS), a 5G NodeB (NB), a Next Generation NodeB (gNB), or the like. Each base station may provide communication coverage for a particular geographic area. In 3GPP, the term "cell" can refer to a coverage area of a base station, a base station subsystem serving this coverage area, or a combination thereof, depending on the context in which the term is used.

A base station 110a-110d may provide communication coverage for a macro cell, a pico cell, a femto cell, another type of cell, or a combination thereof. A macro cell may cover a relatively large geographic area (for example, several kilometers in radius) and may allow unrestricted access by mobile devices with service subscription. A pico cell may cover a relatively small geographic area and may allow unrestricted access by mobile devices with service subscription. A femto cell may cover a relatively small geographic area (for example, a home) and may allow restricted access by mobile devices having association with the femto cell (for example, mobile devices in a closed subscriber group (CSG)). A base station for a macro cell may be referred to as a macro BS. A base station for a pico cell may be referred to as a pico BS. A base station for a femto cell may be referred to as a femto BS or a home BS. In the example illustrated in FIG. 1, a base station 110a may be a macro BS for a macro cell 102a, a base station 110b may be a pico BS for a pico cell 102b, and a base station 110c may be a femto BS for a femto cell 102c. A base station 110a-110d may support one or multiple (for example, three) cells. The terms "eNB", "base station", "NR BS", "gNB", "TRP", "AP", "node B", "5G NB", and "cell" may be used interchangeably herein.

In some examples, a cell may not be stationary, and the geographic area of the cell may move according to the location of a mobile base station. In some examples, the base stations 110a-110d may be interconnected to one another as well as to one or more other base stations or network nodes (not illustrated) in the communications system 100 through various types of backhaul interfaces, such as a direct physical connection, a virtual network, or a combination thereof using any suitable transport network The base station 110a-110d may communicate with the core network 140 over a wired or wireless communication link 126. The wireless device 120a-120e may communicate with the base station 110a-110d over a wireless communication link 122.

The wired communication link 126 may use a variety of wired networks (e.g., Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

The communications system 100 also may include relay stations (e.g., relay BS 110d). A relay station is an entity that can receive a transmission of data from an upstream station (for example, a base station or a mobile device) and transmit the data to a downstream station (for example, a wireless device or a base station). A relay station also may be a mobile device that can relay transmissions for other wireless devices. In the example illustrated in FIG. 1, a relay station 110d may communicate with macro the base station 110a and the wireless device 120d in order to facilitate communication between the base station 110a and the wireless device 120d. A relay station also may be referred to as a relay base station, a relay base station, a relay, etc.

The communications system 100 may be a heterogeneous network that includes base stations of different types, for example, macro base stations, pico base stations, femto base stations, relay base stations, etc. These different types of base stations may have different transmit power levels, different coverage areas, and different impacts on interference in communications system 100. For example, macro base stations may have a high transmit power level (for example, 5 to 40 Watts) whereas pico base stations, femto base stations, and relay base stations may have lower transmit power levels (for example, 0.1 to 2 Watts).

A network controller 130 may couple to a set of base stations and may provide coordination and control for these base stations. The network controller 130 may communicate with the base stations via a backhaul. The base stations also may communicate with one another, for example, directly or indirectly via a wireless or wireline backhaul.

The wireless devices 120a, 120b, 120c may be dispersed throughout communications system 100, and each wireless device may be stationary or mobile. A wireless device also may be referred to as an access terminal, a terminal, a mobile station, a subscriber unit, a station, etc.

A macro base station 110a may communicate with the communication network 140 over a wired or wireless communication link 126. The wireless devices 120a, 120b, 120c may communicate with a base station 110a-110d over a wireless communication link 122.

The wireless communication links 122, 124 may include a plurality of carrier signals, frequencies, or frequency bands, each of which may include a plurality of logical channels. The wireless communication links 122 and 124 may utilize one or more radio access technologies (RATs). Examples of RATs that may be used in a wireless communication link include 3GPP LTE, 3G, 4G, 5G (e.g., NR), GSM, Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links 122, 124 within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE).

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block") may be 12 subcarriers (or 180 kHz). Consequently, the nominal Fast File Transfer (FFT) size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While descriptions of some embodiments may use terminology and examples associated with LTE technologies, various embodiments may be applicable to other wireless communications systems, such as a new radio (NR) or 5G network. NR may utilize OFDM with a cyclic prefix (CP) on the uplink (UL) and downlink (DL) and include support for half-duplex operation using time division duplex (TDD). A single component carrier bandwidth of 100 MHz may be supported. NR resource blocks may span 12 sub-carriers with a subcarrier bandwidth of 75 kHz over a 0.1 millisecond (ms) duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. Multiple Input Multiple Output (MIMO) transmissions with precoding may also be supported. MIMO configurations in the DL may support up to eight transmit antennas with multi-layer DL transmissions up to eight streams and up to two streams per wireless device. Multi-layer transmissions with up to 2 streams per wireless device may be supported. Aggregation of multiple cells may be supported with up to eight serving cells. Alternatively, NR may support a different air interface, other than an OFDM-based air interface.

Some mobile devices may be considered machine-type communication (MTC) or evolved or enhanced machine-type communication (eMTC) mobile devices. MTC and eMTC mobile devices include, for example, robots, drones, remote devices, sensors, meters, monitors, location tags, etc., that may communicate with a base station, another device (for example, remote device), or some other entity. A wireless node may provide, for example, connectivity for or to a network (for example, a wide area network such as Internet or a cellular network) via a wired or wireless communication link. Some mobile devices may be considered Internet-of-Things (IoT) devices or may be implemented as NB-IoT (narrowband internet of things) devices. A wireless device 120a-e may be included inside a housing that houses components of the wireless device, such as processor components, memory components, similar components, or a combination thereof.

In general, any number of communication systems and any number of wireless networks may be deployed in a given geographic area. Each communications system and wireless network may support a particular radio access technology (RAT) and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between communications systems of different RATs. In some cases, NR or 5G RAT networks may be deployed.

In some implementations, two or more mobile devices 120a-e (for example, illustrated as the wireless device 120a and the wireless device 120e) may communicate directly using one or more sidelink channels 124 (for example, without using a base station 110 as an intermediary to communicate with one another). For example, the wireless devices 120a-e may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the wireless device 120a-e may perform scheduling operations, resource selection operations, as well as other operations described elsewhere herein as being performed by the base station 110a.

Figure 2:
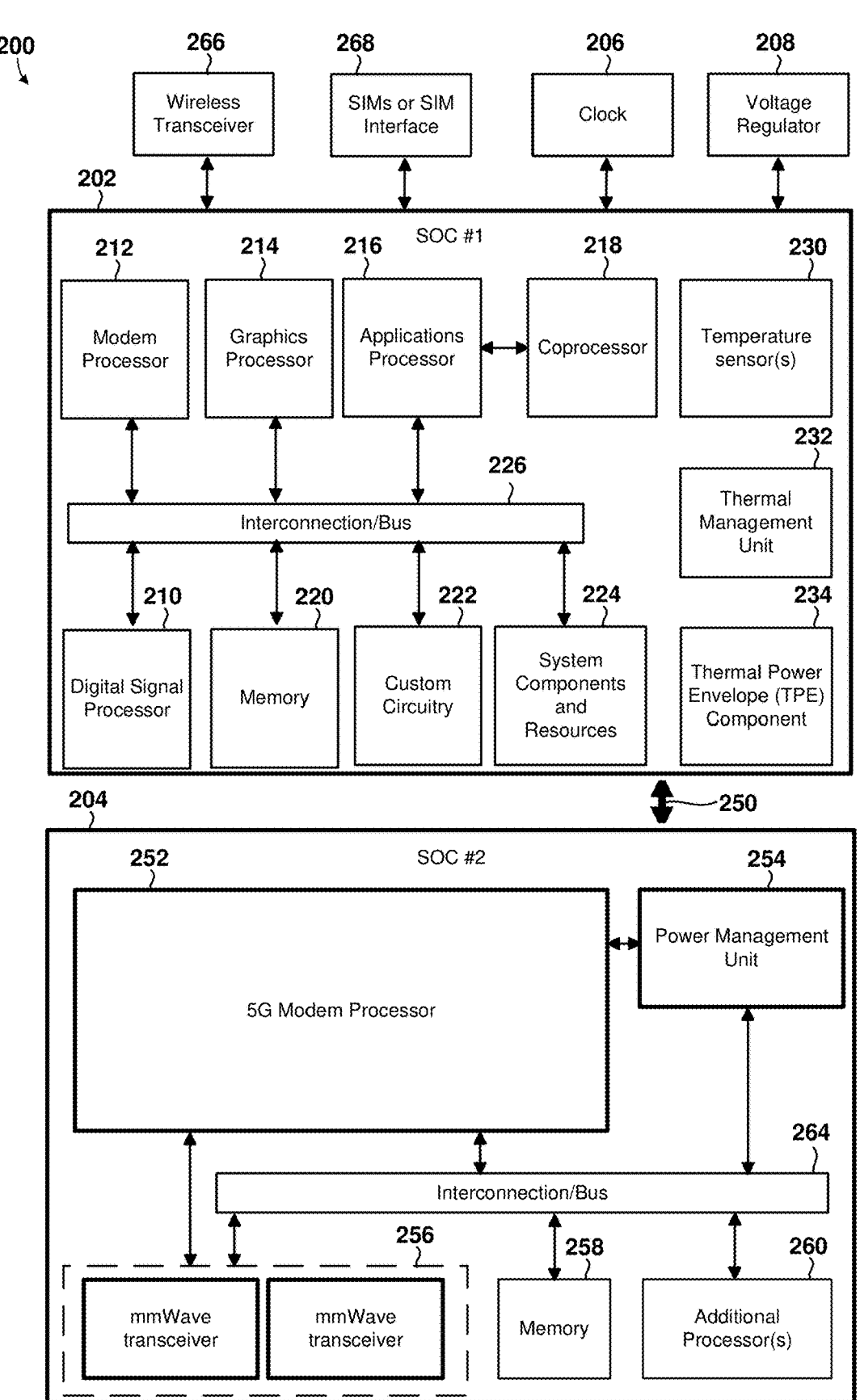
FIG. 2 is a component block diagram illustrating an example computing and wireless modem system suitable for implementing any of the various embodiments.

FIG. 2 is a component block diagram illustrating an example computing and wireless modem system 200 suitable for implementing any of the various embodiments. Various embodiments may be implemented on a number of single processor and multiprocessor computer systems, including a system-on-chip (SOC) or system in a package (SIP).

With reference to FIGS. 1 and 2, the illustrated example wireless device 200 (which may be a SIP in some embodiments) includes a two SOCs 202, 204 coupled to a clock 206, a voltage regulator 208, at least one SIM 268 and/or a SIM interface and a wireless transceiver 266 configured to send and receive wireless communications via an antenna (not shown) to/from network wireless devices, such as a base station 110a. In some embodiments, the first SOC 202 operate as central processing unit (CPU) of the wireless device that carries out the instructions of software application programs by performing the arithmetic, logical, control and input/output (I/O) operations specified by the instructions. In some embodiments, the second SOC 204 may operate as a specialized processing unit. For example, the second SOC 204 may operate as a specialized 5G processing unit responsible for managing high volume, high speed (e.g., 5 Gbps, etc.), and/or very high frequency short wave length (e.g., 28 GHz mmWave spectrum, etc.) communications.

The first SOC 202 may include a digital signal processor (DSP) 210, a modem processor 212, a graphics processor 214, an application processor (AP) 216, one or more coprocessors 218 (e.g., vector co-processor) connected to one or more of the processors, memory 220, custom circuitry 222, system components and resources 224, an interconnection/bus module 226, one or more temperature sensors 230, a thermal management unit 232, and a thermal power envelope (TPE) component 234. The second SOC 204 may include a 5G modem processor 252, a power management unit 254, an interconnection/bus module 264, the plurality of mmWave transceivers 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first SOC 202 may include a processor that executes a first type of operating system (e.g., FreeBSD, LINUX, OS X, etc.) and a processor that executes a second type of operating system (e.g., MICROSOFT WINDOWS 10). In addition, any or all of the processors 210, 212, 214, 216, 218, 252, 260 may be included as part of a processor cluster architecture (e.g., a synchronous processor cluster architecture, an asynchronous or heterogeneous processor cluster architecture, etc.).

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on a wireless device. The system components and resources 224 and/or custom circuitry 222 may also include circuitry to interface with peripheral devices, such as cameras, electronic displays, wireless communication devices, external memory chips, etc.

The first and second SOC 202, 204 may communicate via interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mmWave transceivers 256, memory 258, and various additional processors 260 via the interconnection/bus module 264. The interconnection/bus module 226, 250, 264 may include an array of reconfigurable logic gates and/or implement a bus architecture (e.g., CoreConnect, AMBA, etc.). Communications may be provided by advanced interconnects, such as high-performance networks-on chip (NoCs).

The first and/or second SOCs 202, 204 may further include an input/output module (not illustrated) for communicating with resources external to the SOC, such as a clock 206, a voltage regulator 208, one or more wireless transceivers 266, and at least one SIM 268 and/or SIM interface (i.e., an interface for receiving one or more SIM cards). Resources external to the SOC (e.g., clock 206, voltage regulator 208) may be shared by two or more of the internal SOC processors/cores. The at least one SIM 268 (or one or more SIM cards coupled to one or more SIM interfaces) may store information supporting multiple subscriptions, including a first 5GNR subscription and a second 5GNR subscription, etc.

In addition to the example SIP 200 discussed above, various embodiments may be implemented in a wide variety of computing systems, which may include a single processor, multiple processors, multicore processors, or any combination thereof.

Figure 3:
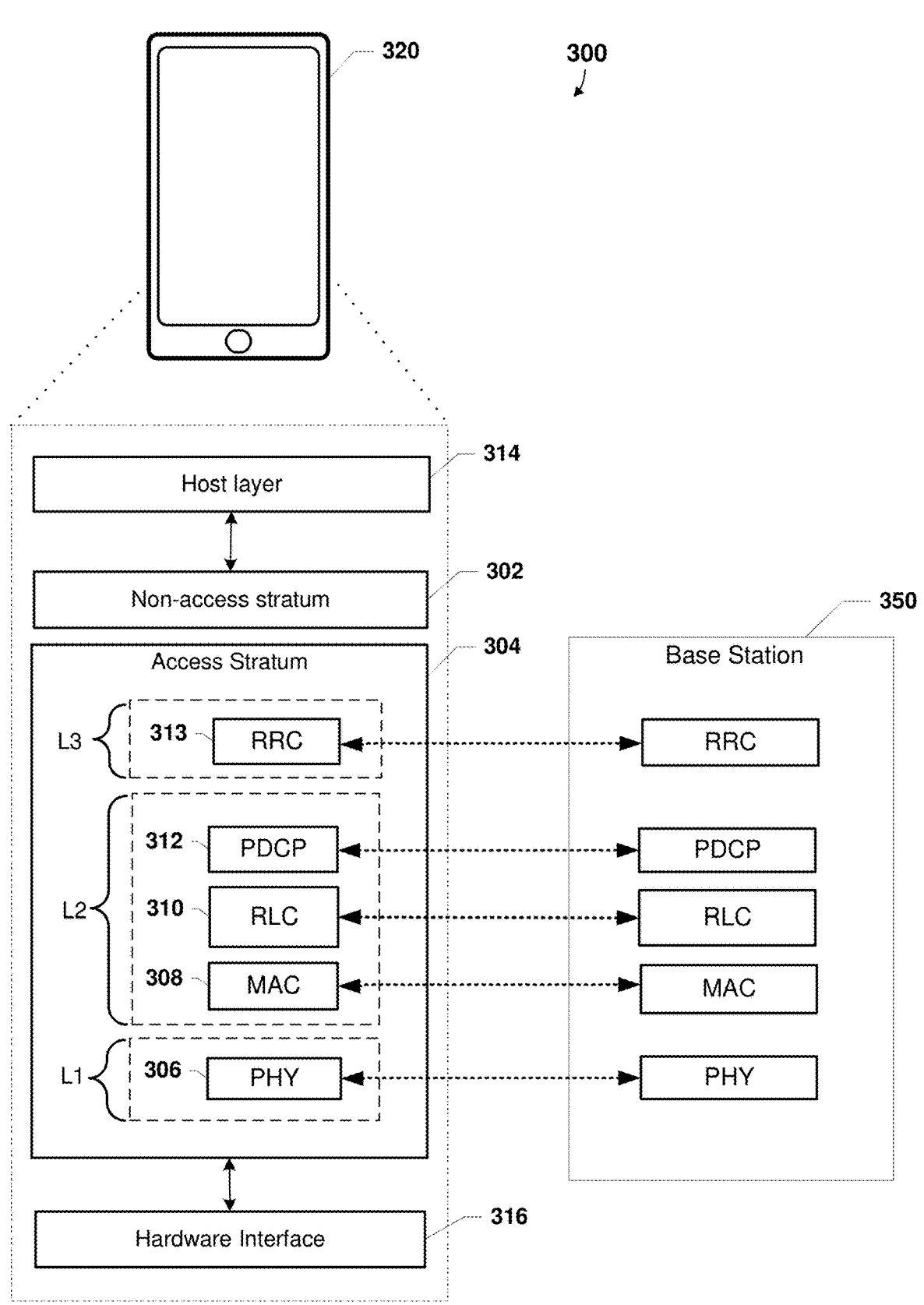
FIG. 3 is a component block diagram illustrating a software architecture including a radio protocol stack for the user and control planes in wireless communications suitable for implementing any of the various embodiments.

FIG. 3 is a component block diagram illustrating a software architecture 300 including a radio protocol stack for the user and control planes in wireless communications suitable for implementing any of the various embodiments. With reference to FIGS. 1-3, the wireless device 320 may implement the software architecture 300 to facilitate communication between a wireless device 320 (e.g., the wireless device 120a-120e, 200) and the base station 350 (e.g., the base station 110a) of a communication system (e.g., 100). In various embodiments, layers in software architecture 300 may form logical connections with corresponding layers in software of the base station 350. The software architecture 300 may be distributed among one or more processors (e.g., the processors 212, 214, 216, 218, 252, 260). While illustrated with respect to one radio protocol stack, in a multi-SIM (subscriber identity module) wireless device, the software architecture 300 may include multiple protocol stacks, each of which may be associated with a different SIM (e.g., two protocol stacks associated with two SIMs, respectively, in a dual-SIM wireless communication device). While described below with reference to LTE communication layers, the software architecture 300 may support any of variety of standards and protocols for wireless communications, and/or may include additional protocol stacks that support any of variety of standards and protocols wireless communications.

The software architecture 300 may include a Non-Access Stratum (NAS) 302 and an Access Stratum (AS) 304. The NAS 302 may include functions and protocols to support packet filtering, security management, mobility control, session management, and traffic and signaling between a SIM(s) of the wireless device (e.g., SIM(s) 204) and its core network 140. The AS 304 may include functions and protocols that support communication between a SIM(s) (e.g., SIM(s) 204) and entities of supported access networks (e.g., a base station). In particular, the AS 304 may include at least three layers (Layer 1, Layer 2, and Layer 3), each of which may contain various sub-layers.

In the user and control planes, Layer 1 (L1) of the AS 304 may be a physical layer (PHY) 306, which may oversee functions that enable transmission and/or reception over the air interface. Examples of such physical layer 306 functions may include cyclic redundancy check (CRC) attachment, coding blocks, scrambling and descrambling, modulation and demodulation, signal measurements, MIMO, etc. The physical layer may include various logical channels, including the Physical Downlink Control Channel (PDCCH) and the Physical Downlink Shared Channel (PDSCH).

In the user and control planes, Layer 2 (L2) of the AS 304 may be responsible for the link between the wireless device 320 and the base station 350 over the physical layer 306. In the various embodiments, Layer 2 may include a media access control (MAC) sublayer 308, a radio link control (RLC) sublayer 310, and a packet data convergence protocol (PDCP) 312 sublayer, each of which form logical connections terminating at the base station 350.

In the control plane, Layer 3 (L3) of the AS 304 may include a radio resource control (RRC) sublayer 3. While not shown, the software architecture 300 may include additional Layer 3 sublayers, as well as various upper layers above Layer 3. In various embodiments, the RRC sublayer 313 may provide functions INCLUDING broadcasting system information, paging, and establishing and releasing an RRC signaling connection between the wireless device 320 and the base station 350.

In various embodiments, the PDCP sublayer 312 may provide uplink functions including multiplexing between different radio bearers and logical channels, sequence number addition, handover data handling, integrity protection, ciphering, and header compression. In the downlink, the PDCP sublayer 312 may provide functions that include in-sequence delivery of data packets, duplicate data packet detection, integrity validation, deciphering, and header decompression.

In the uplink, the RLC sublayer 310 may provide segmentation and concatenation of upper layer data packets, retransmission of lost data packets, and Automatic Repeat Request (ARQ). In the downlink, while the RLC sublayer 310 functions may include reordering of data packets to compensate for out-of-order reception, reassembly of upper layer data packets, and ARQ.

In the uplink, MAC sublayer 308 may provide functions including multiplexing between logical and transport channels, random access procedure, logical channel priority, and hybrid-ARQ (HARQ) operations. In the downlink, the MAC layer functions may include channel mapping within a cell, de-multiplexing, discontinuous reception (DRX), and HARQ operations.

While the software architecture 300 may provide functions to transmit data through physical media, the software architecture 300 may further include at least one host layer 314 to provide data transfer services to various applications in the wireless device 320. In some embodiments, application-specific functions provided by the at least one host layer 314 may provide an interface between the software architecture and the general purpose processor 206.

In other embodiments, the software architecture 300 may include one or more higher logical layer (e.g., transport, session, presentation, application, etc.) that provide host layer functions. For example, in some embodiments, the software architecture 300 may include a network layer (e.g., IP layer) in which a logical connection terminates at a packet data network (PDN) gateway (PGW). In some embodiments, the software architecture 300 may include an application layer in which a logical connection terminates at another device (e.g., end user device, server, etc.). In some embodiments, the software architecture 300 may further include in the AS 304 a hardware interface 316 between the physical layer 306 and the communication hardware (e.g., one or more radio frequency (RF) transceivers).

Figure 4:
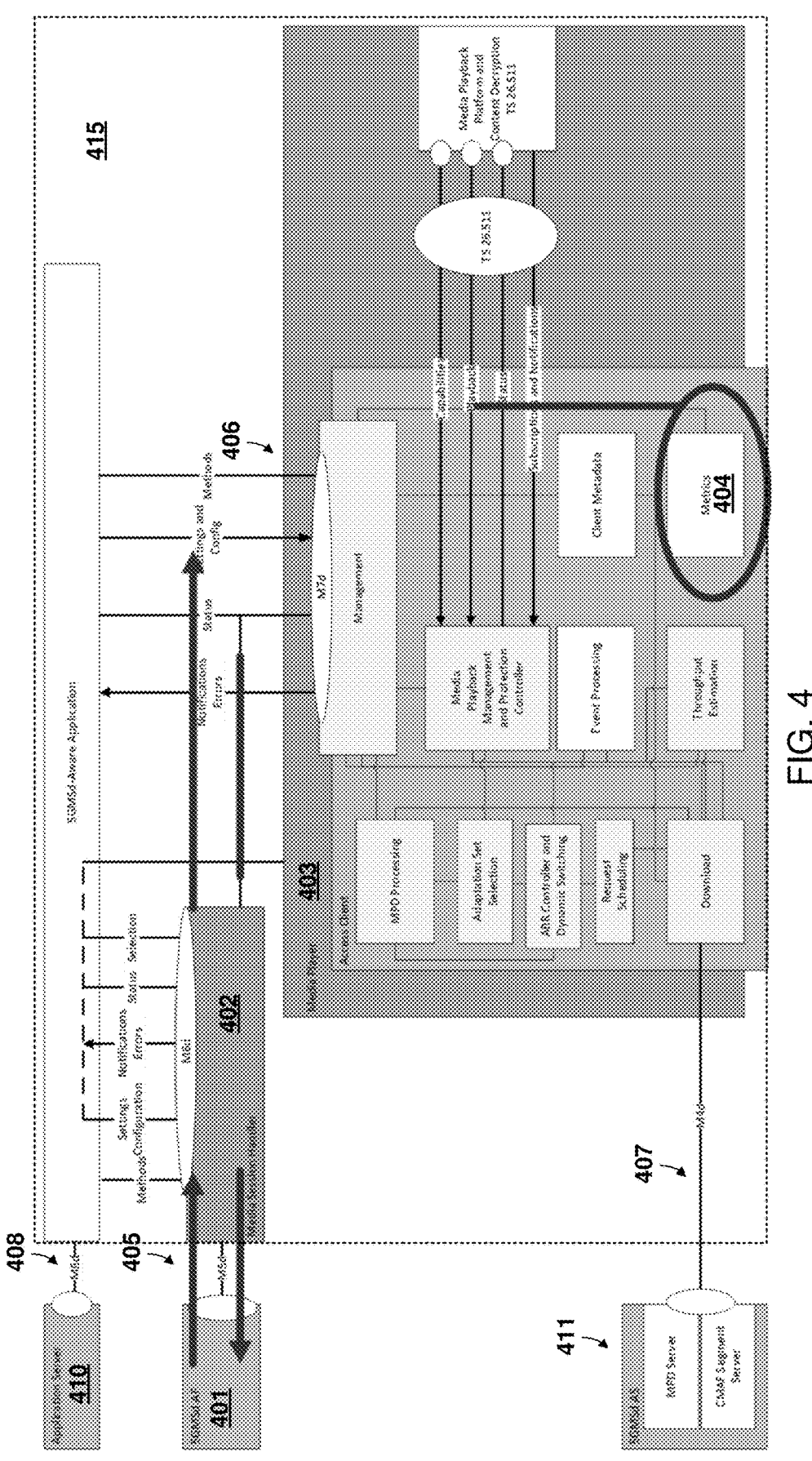
FIG. 4 is an architecture diagram illustrating interactions and interfaces for downlink 5G Media Streaming between an applications function (AF) server and wireless device in accordance with various embodiments.

FIG. 4 is an architecture diagram illustrating interactions and interfaces between an applications function (AF) server 401 and wireless device 415 in a downlink streaming service context in accordance with various embodiments. With reference to FIGS. 1-4, the wireless device 415 (e.g., wireless device 120a-e, 200, 320) may include a Media Session Handler 402 running on a processor (e.g., the processors 212, 214, 216, 218, 252, 260) of the wireless device 415. The Media Session Handler 402 may interface (e.g., via the M7d interface) with a Media Player 403 running on a processor (e.g., the processors 212, 214, 216, 218, 252, 260) of the wireless device 415. The wireless device 415 may be connected to a radio access network (RAN) of a 5G system (5GS) network (e.g., network 100). The connections to the RAN may support various interfaces to network computing devices in the 5GS network, such as network computing devices in the 5G core network (e.g., 140) including one or more AF servers 401, one or more application servers 410, 411, etc. The Media Session Handler 402 of the wireless device 415 may communicate (e.g., exchange messages) with an AF server 401 via a control plane based M5d interface 405. The wireless device 415 may also communicate with application server 410 via the M8d interface 408 and/or the application server 411 via the M4d interface 407. The Media Player 403 may include a metrics collection module 404 that may log metrics measurements, such as QoE metrics, related to a 5G Media Streaming session of the wireless device 415.

The AF server 401 may be configured to send a metrics configuration message to a wireless device 415 via a M5d interface which may be a RESTful API exposed by the AF. The metrics configuration message may indicate one or more metrics measurement, collection and reporting requirements associated with a 5G Media Streaming service. The AF server 401 may be configured to establish a media session for the 5G Media Streaming service with the wireless device 415. The AF server 401 may be configured to receive a metrics report associated with the media session from the wireless device via the M5d interface. The metrics report may include collected metrics associated with the one or more metrics measurement, collection and reporting requirements. The AF server 401 may be configured to process the metrics report to generate a processed metrics report. The AF server 401 may be configured to send the processed metrics report to an application server of the 5G Media Streaming service, an OAM server of the 5GS network, and/or a third-party server.

In various embodiments, the one or more metrics measurement, collection and reporting requirements may include QoE metrics associated with applications or content services provisioned from outside the 5GS network to the 5GS network and/or wherein the one or more metrics measurement, collection and reporting requirements includes QoE metrics associated with metrics requested from outside the 5GS network. The one or more metrics measurement, collection and reporting requirements may include non-3GPP metrics. In various embodiments, the one or more metrics measurement, collection and reporting requirements may include QoE metrics associated with applications or content services provisioned from outside the 5GS network to the 5GS network and/or wherein the one or more metrics measurement, collection and reporting requirements include QoE metrics associated with metrics requested from outside the 5GS network. The one or more metrics measurement, collection and reporting requirements may include non-3GPP metrics.

The Media Session Handler 402 may be configured to send the metrics report associated with the media session to the AF server 401 via the M5d interface.

The Media Session Handler 402 may be configured to establish a media session for the 5G Media Streaming service with the AF server 401.

The Media Session Handler 402 may be configured to receive a metrics configuration message from an AF server of the 5GS network via a M5d interface. The metrics configuration message may further indicate a metrics scheme. The metrics scheme may be based on settings of the 5GS network and metrics scheme settings received from outside the 5GS network. As examples, the metrics scheme may be based on settings of the 5GS network, such as 3GPP DASH metrics, the metrics scheme may be based on metrics scheme settings received from outside the 5GS network, such as metrics scheme settings defined in a specification outside of 3GPP (e.g., CTA 2066, International Organization for Standardization (ISO)/International Electrotechnical Commission (IEC) (ISO/IEC) 23009-1, etc.), and/or the metrics scheme may be based on metrics scheme settings defined by a proprietary metrics system. The metrics configuration message may indicate the metrics scheme. The metrics configuration message may indicate one or more metrics measurement, collection and reporting requirements associated with a 5G Media Streaming service.

The Media Session Handler 402 may be configured to determine one or more metrics to be collected for the media session based at least in part on the one or more metrics measurement, collection and reporting requirements in response to establishing the media session.

The Media Session Handler 402 may be configured to query the Media Player 403 of the wireless device selected for playout of content for the media session to determine whether the Media Player has a capability to measure and log the determined one or more metrics.

The Media Session Handler 402 may be configured to send an error message to the AF server 401 via the M5d interface in response to determining that the Media Player 403 does not have the capability to measure and log the determined one or more metrics.

The Media Session Handler 402 may be configured to start playout of content for the media session in response to determining that Media Player has the capability to measure and log the determined one or more metrics.

The Media Session Handler 402 may be configured to receive logged metrics from the Media Player 403 after the start of playout of the content for the media session. Receiving the metrics log from the Media Player 403 after the start of playout of the content for the media session may include sending periodic requests for the collection of the metrics log to the Media Player 403 after the start of playout of the content for the media session according to the metrics scheme and receiving responses from the Media Player 403 including the logged metrics. The metrics scheme may define a periodic request triggering condition. As examples, the periodic request triggering condition may be an interval timer expiration, a streamed content amount threshold being reached, and/or an occurrence of a specified event. Receiving the collected metrics log from the Media Player 403 after the start of playout of the content for the media session may include receiving the logged metrics from the Media Player 403 after the start of playout of the content for the media session according to a first metrics scheme and a second metrics scheme. As an example, the first metrics report may include collected metrics according to the first metrics scheme, and sending a second metrics report associated with the media session to another AF server 401 via the M5d. The second metrics report may include collected metrics according to the second metrics scheme.

The Media Session Handler 402 may be configured to aggregate the collected metrics according to a metrics scheme to generate a metrics report associated with the media session. As examples, processing the metrics report to generate the processed metrics report may include filtering, aggregating, and/or reformatting the collected metrics. As an example, the processing the metrics report to generate the processed metrics report may include processing the metrics report to generate the processed metrics report according to one or more rules indicated by the application server of the 5G Media Streaming service, the OAM server of the 5GS network, and/or a third-party server. Sending the metrics report associated with the media session to the AF server 401 via the M5d interface may include sending the metrics report associated with the media session to the AF server 401 via the M5d interface according to the metrics scheme. The metrics scheme may define a metrics report rule defining when to send the metrics report.

The metrics reporting rule may indicate a periodicity for sending the metric report. The collected metrics from the Media Player 403 may be received via the M7d interface between the Media Player 403 and the Media Session Handler 402. Sending the metrics report associated with the media session to the AF server 401 via the M5d interface may include sending a first metrics report associated with the media session to the AF server via the M5d interface.

In various embodiments, configuration information on metrics measurement, collection and reporting, according to one or more metrics schemes which are 3GPP and/or third party-defined (e.g., non-3GPP), may be sent over the M5d interface 405 from the AF server 401 to the Media Session Handler 402 running on a processor of a wireless device 415. In various embodiments, 3GPP and/or third party-defined metrics (e.g., non-3GPP) and measurement rules defined by the metrics schemes may be exposed to the Media Player 403 via the M7d interface 406 and then measured and logged by the Media Player's 403 metrics measurement and logging module 404. The logged metrics may be collected by the Media Session Handler 402 via the M7d interface 406. In various embodiments, the logged metrics by the Media Player 403 may be exposed to the Media Session Handler 402 over the M7d interface in response to the occurrence of events (e.g., threshold conditions occurring, timer expiration occurring, etc.) and/or in response to query-based requests from the Media Session Handler 402 (e.g., Get requests from the Media Session Handler 402 to the metrics measurement and logging module 404 of the Media Player 403 over the M7d interface). In various embodiments, the Media Session Handler 403 in accordance to a reporting rule defined by the metrics scheme may use the information on the M7d interface to send aggregated metrics reports to the AF server 401 through the M5d interface 405. As examples, the reporting rule may be configured to trigger reporting by the Media Session Handler 402 periodically at defined intervals, by specified percentage of streaming sessions for which reporting is required, based on specific events, etc. In various embodiments, the AF server 401 may perform processing of the received metrics data in the metrics report from the Media Session Handler 402, such as filtering, reformatting, aggregation, etc. In various embodiments, the AF server 401 may subsequently deliver the processed metrics report to one or more client network entities, such as a 3GPP OAM server, a third-party application provider's application server, and/or a third-party server.

While FIG. 4 illustrates an example of a Media Session Handler 402 interacting with a Media Player 403, the Media Player 403 is merely an example of a Media Stream Handler suitable for use in various embodiments. A Media Streamer may be substituted for the Media Player 403 in an uplink 5G Media Streaming service and similarly a Media Streamer may include the metrics module 404. In an uplink 5G Media Streaming service the M5d interface 405 may be referred to as an M5u interface and the M7d interface 406 may be referred to as an M7u interface. In an uplink 5G Media Streaming service metrics measurement, collection, and reporting by the Media Session Handler 402 may occur as discussed with reference to FIG. 4 for a downlink 5G Media Streaming service with the Media Player 403 substituted by a Media Streamer.

Figure 5A:
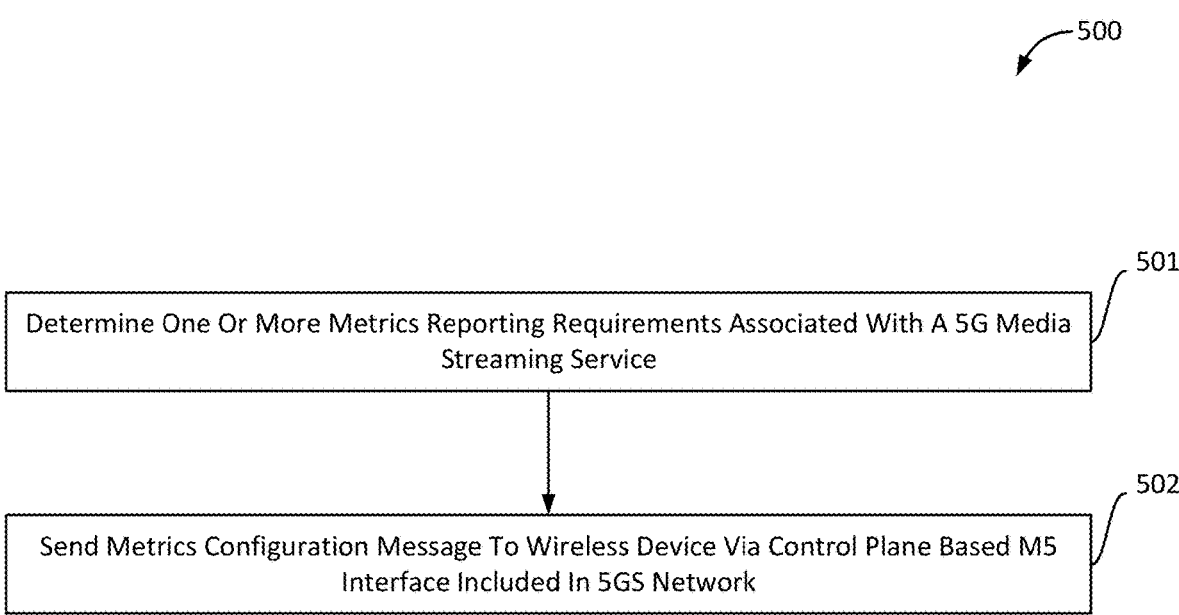
FIG. 5A is a process flow diagram illustrating a method for supporting metrics collection and reporting for 5G Media Streaming in a 5GS network in accordance with various embodiments.

FIG. 5A is a process flow diagram illustrating a method 500 for supporting metrics collection and reporting for 5G Media Streaming that may be performed by a processor of a network computing device of a 5GS network. With reference to FIGS. 1-5A, the operations of method 500 may be implemented by a processor of a network computing device, such as an AF server (e.g., 401). The operations of method 500 may be performed for an uplink 5G Media Streaming Service and/or a downlink 5G Media Streaming Service.

In block 501, the processor may perform operations including determining one or more metrics measurement, collection and reporting requirements associated with a 5G Media Streaming service. The 5G Media Streaming service may be an uplink 5G Media Streaming service and/or a downlink 5G Media Streaming service. The one or more metrics measurement, collection and reporting requirements may include one or more metrics to be measured, collected and reported associated with the 5G Media Streaming service. The one or more metrics may be indicated in one or more metrics schemes, such as 3GPP metrics schemes and/or non-3GPP metrics schemes indicated to the AF server. In some embodiments, the one or more metrics measurement, collection and reporting requirements may include QoE metrics associated with applications or content services provisioned from outside the 5GS network to the 5GS network. In some embodiments, the one or more metrics measurement, collection and reporting requirements may include QoE metrics requested from outside the 5GS network. In some embodiments, the one or more metrics measurement, collection and reporting requirements may include non-3GPP metrics.

In block 502, the processor may perform operations including sending a metrics configuration message to a wireless device via a control plane based a M5 interface included in the 5GS network. For an uplink 5G Media Streaming service, the M5 interface may be an M5u interface. For a downlink 5G Media Streaming service, the M5 interface may be an M5d interface. The metrics configuration message may indicate one or more metrics measurement, collection and reporting requirements associated with a 5G Media Streaming service. The one or more metrics measurement, collection and reporting requirements may include one or more metrics schemes. In some embodiments, the metrics configuration message may further indicate a metrics scheme whose configuration defines metrics measurement, collection and reporting rules. In some embodiments, the metrics scheme may be based on settings of the 5GS network and/or metrics scheme settings received from outside the 5GS network. As examples, the metrics scheme may be based on settings of the 5GS network, such as 3GPP DASH metrics, the metrics scheme may be based on metrics scheme settings received from outside the 5GS network, such as metrics scheme settings defined in a specification outside of 3GPP (e.g., CTA 2066, International Organization for Standardization (ISO)/International Electrotechnical Commission (IEC) (ISO/IEC) 23009-1, etc.), and/or the metrics scheme may be based on metrics scheme settings defined by a proprietary metrics system.

FIG. 5B is a process flow diagram illustrating a method 550 for supporting metrics collection and reporting for 5G Media Streaming that may be performed by a processor of a network computing device of a 5GS network. With reference to FIGS. 1-5B, the operations of method 550 may be implemented by a processor of a network computing device, such as an AF server (e.g., 401). The operations of the method 550 may be performed for an uplink 5G Media Streaming Service and/or a downlink 5G Media Streaming Service. In some embodiments, the operations of method 550 may be performed in conjunction with the operations of method 500 (FIG. 5A). As a specific example, the operations of method 550 may be performed in response to sending the metrics configuration message to the wireless device via the M5d interface included in the 5GS network in block 502.

In block 504, the processor may perform operations including establishing a media session for the downlink 5G Media Streaming service with the wireless device.

In block 506, the processor may perform operations including receiving a metrics report associated with the media session from the wireless device via the control plane based the M5 interface included in the 5GS network. The metrics report may include collected metrics associated with the one or more metrics measurement, collection and reporting requirements. For an uplink 5G Media Streaming service, the M5 interface may be an M5u interface. For a downlink 5G Media Streaming service, the M5 interface may be an M5d interface.

In block 508, the processor may perform operations including processing the metrics report to generate a processed metrics report. In some embodiments, processing the metrics report to generate the processed metrics report may include filtering, aggregating, and/or reformatting the collected metrics.

In block 510, the processor may perform operations including providing the processed metrics report to an application server of the 5G Media Streaming service, an OAM server of the 5GS network, and/or a third-party server. In various embodiments, providing the processed metrics report to an application server of the 5G Media Streaming service, an OAM server of the 5GS network, and/or a third-party server may include performing operations to send the processed metrics report to an application server of the 5G Media Streaming service, an OAM server of the 5GS network, and/or a third-party server.

FIG. 6A is a process flow diagram illustrating a method 600 for supporting metrics collection and reporting for 5G Media Streaming that may be performed by a Media Session Handler running on a processor of a wireless device connected to a RAN of a 5GS network. With reference to FIGS. 1-6A, the operations of method 600 may be implemented by a Media Session Handler (e.g., 402) running on a processor of a wireless device (e.g., 120a-120e, 200, 320, 415) connected to a RAN of a 5GS network (e.g., network 100). The operations of method 600 may be performed for an uplink 5G Media Streaming Service and/or a downlink 5G Media Streaming Service.

In block 612, the processor may perform operations including receiving a metrics configuration message from an AF server of the 5GS network via an application layer control plane based M5 interface. For an uplink 5G Media Streaming service, the application layer control plane based M5 interface may be an M5u interface. For a downlink 5G Media Streaming service, the application layer control plane based M5 interface may be an M5d interface. In various embodiments, the metrics configuration message may indicate one or more metrics measurement, collection and reporting requirements associated with a 5G Media Streaming service. In some embodiments, the metrics configuration message may indicate one or more metrics schemes. In some embodiments, a metrics scheme may define a periodic request triggering condition. In some embodiments, the periodic request triggering condition may be an interval timer expiration, a streamed content amount threshold being reached, and/or an occurrence of a specified event. In some embodiments, the metrics scheme may define a metrics report rule defining when to send the metrics report. In some embodiments, the metrics reporting rule may indicate a periodicity for sending the metric report. In some embodiments, the one or more metrics measurement, collection and reporting requirements may include QoE metrics associated with applications or content services provisioned from outside the 5GS network to the 5GS network. In some embodiments, the one or more metrics measurement, collection and reporting requirements may include QoE metrics requested from outside the 5GS network. In some embodiments, the one or more metrics measurement, collection and reporting requirements may include non-3GPP metrics.

In block 614, the processor may perform operations including establishing a media session for the 5G Media Streaming service with the AF server.

In block 616, the processor may perform operations including determining one or more metrics to be collected for the media session based at least in part on the one or more metrics measurement, collection and reporting requirements in response to establishing the media session.

In block 618, the processor may perform operations including querying a Media Stream Handler of the wireless device selected for the media session to determine whether the Media Stream Handler has a capability to measure and log the determined one or more metrics. In a downlink 5G Media Streaming service, querying a Media Stream Handler of the wireless device selected for the media session to determine whether the Media Stream Handler has a capability to measure and log the determined one or more metrics may include querying a Media Player of the wireless device selected for playout of content for the media session to determine whether the Media Player has a capability to measure and log the determined one or more metrics In an uplink 5G Media Streaming service, querying a Media Stream Handler of the wireless device selected for the media session to determine whether the Media Stream Handler has a capability to measure and log the determined one or more metrics may include querying a Media Streamer of the wireless device selected for capturing content for the media session to determine whether the Media Streamer has a capability to measure and log the determined one or more metrics.

In block 620, the processor may perform operations including sending an error message to the AF server via the M5 interface in response to determining that the Media Stream Handler does not have the capability to measure and log the determined one or more metrics. For an uplink 5G Media Streaming service, the error message may be an error message indicating a Media Streamer does not have the capability to measure and log the determined one or more metrics sent via the M5u interface. For a downlink 5G Media Streaming service, the error message may be an error message indicating a Media Player does not have the capability to measure and log the determined one or more metrics sent via the M5d interface.

In block 622, the processor may perform operations including starting the media session in response to determining that Media Stream Handler has the capability to measure and log the determined one or more metrics. For an uplink 5G Media Streaming service, starting the media session may include starting capture of content for the media session. For a downlink 5G Media streaming service, starting the media session may include starting playout of content for the media session.

Figure 6B:
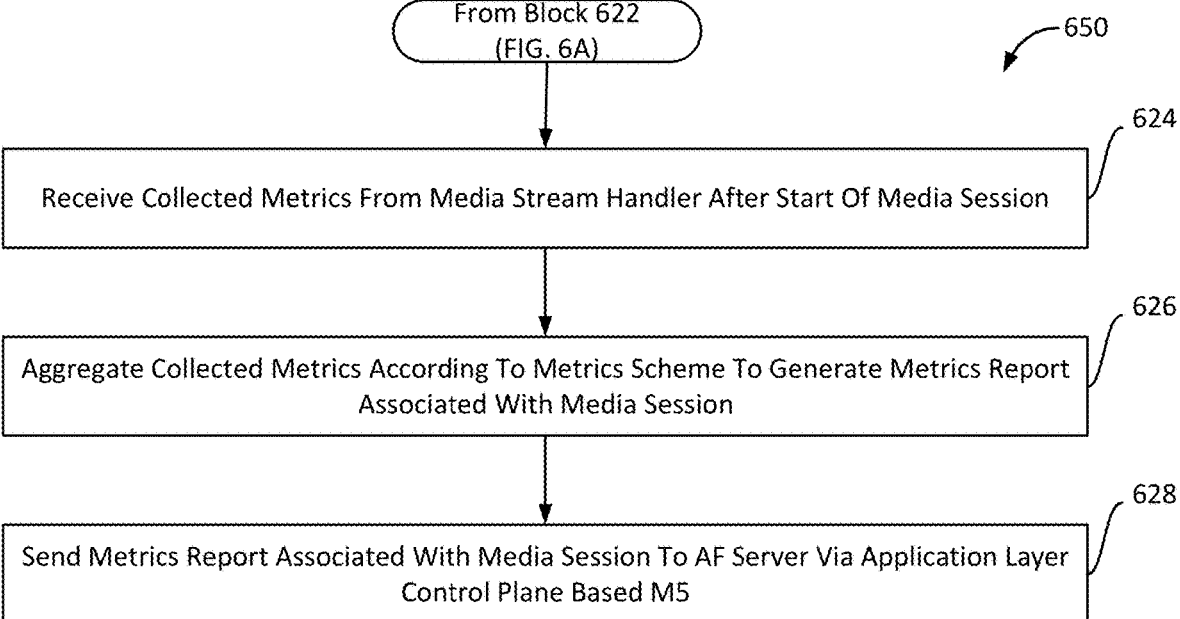
FIG. 6B is a process flow diagram illustrating a method for supporting metrics collection and reporting for 5G Media Streaming in a 5GS network in accordance with various embodiments.

FIG. 6B is a process flow diagram illustrating a method 650 for supporting metrics collection and reporting for 5G Media Streaming that may be performed by a Media Session Handler running on a processor of a wireless device connected to a RAN of a 5GS network. With reference to FIGS. 1-6B, the operations of method 650 may be implemented by a Media Session Handler (e.g., 402) running on a processor of a wireless device (e.g., 120a-120e, 200, 320, 415) connected to a RAN of a 5GS network (e.g., network 100). The operations of method 650 may be performed for an uplink 5G Media Streaming Service and/or a downlink 5G Media Streaming Service. In some embodiments, the operations of method 650 may be performed in conjunction with the operations of method 600 (FIG. 6A). As a specific example, the operations of method 650 may be performed in response to playout of content starting in block 622.

In block 624, the processor may perform operations including receiving collected metrics from the Media Stream Handler after the start of the media session. For an uplink 5G Media Streaming service, the Media Stream Handler may be a Media Streamer. For a downlink 5G Media streaming service, the Media Stream Handler may be a Media Player. In some embodiments, the collected metrics from the Media Player may be received via the M7d interface between the Media Player and the Media Session Handler. In some embodiments, receiving the collected metrics from the Media Player after the start of the media session may include receiving the collected metrics from the Media Player after the start of playout of the content for the media session according to multiple different metrics schemes, such as a first metrics scheme and a second metrics scheme. In some embodiments, the collected metrics from the Media Streamer may be received via the M7u interface between the Media Streamer and the Media Session Handler. In some embodiments, receiving the collected metrics from the Media Streamer after the start of the media session may include receiving the collected metrics from the Media Streamer after the start of capture of the content for the media session according to multiple different metrics schemes, such as a first metrics scheme and a second metrics scheme.

In block 626, the processor may perform operations including aggregating the collected metrics according to a metrics scheme to generate a metrics report associated with the media session.

In block 628, the processor may perform operations including sending the metrics report associated with the media session to the AF server via the application layer control plane based M5 interface. For an uplink 5G Media Streaming service, the application layer control plane based M5 interface may be an M5u interface. For a downlink 5G Media Streaming service, the application layer control plane based M5 interface may be an M5d interface. In some embodiments, sending the metrics report associated with the media session to the AF server via the M5 interface may include sending the metrics report associated with the media session to the AF server via the M5 interface according to the metrics scheme. In some embodiments, sending the metrics report associated with the media session to the AF server via the M5 interface may include sending a first metrics report associated with the media session to the AF server via the M5 interface, the first metrics report including collected metrics according to a first metrics scheme, and sending a second metrics report associated with the media session to another AF server via the M5 interface, the second metrics report including collected metrics according to the second metrics scheme.

Figure 7A:
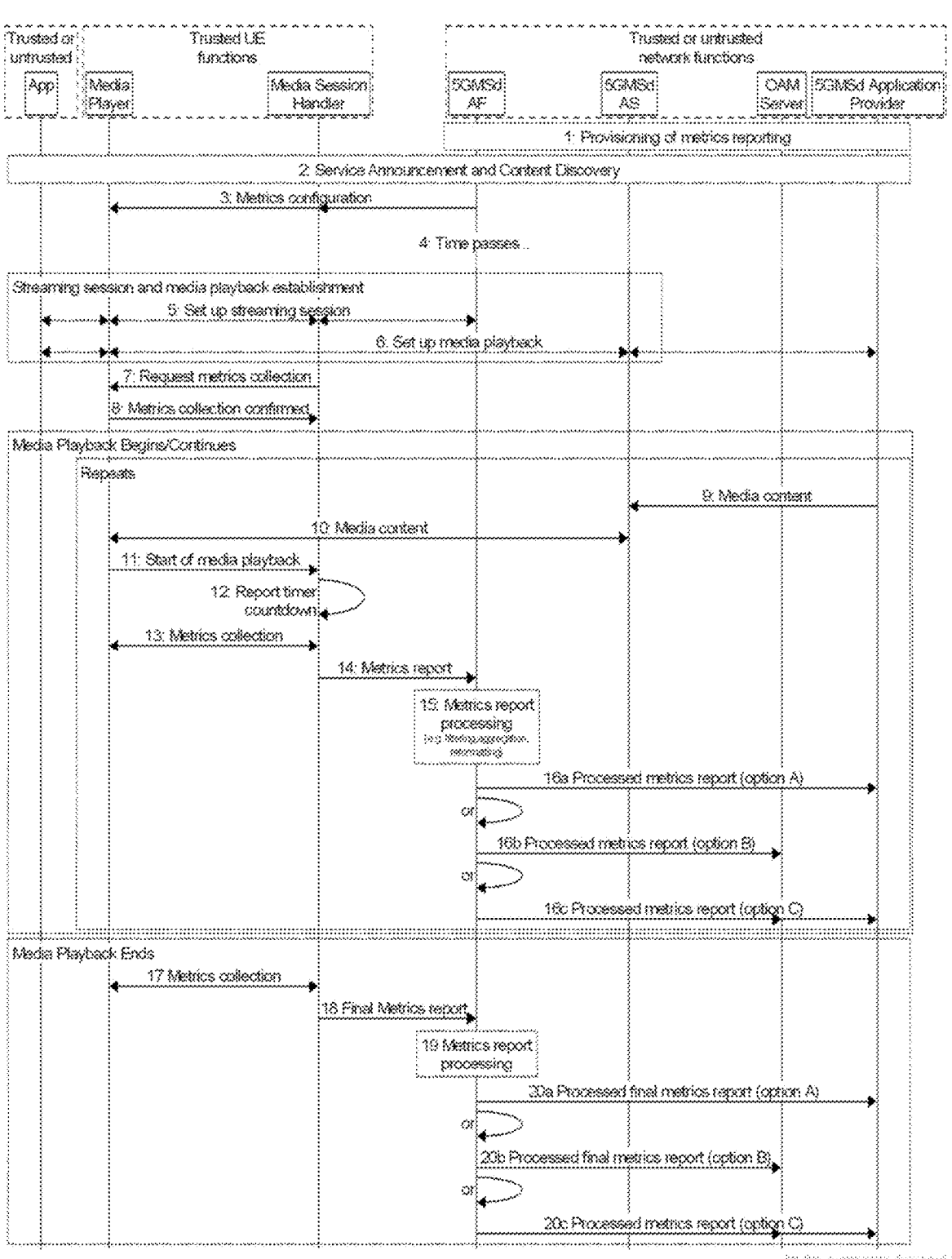
FIG. 7A is a call flow diagram illustrating interactions between a Media Session Handler and Media Player of a wireless device and an AF server of a 5GS network for supporting metrics collection and reporting for downlink 5G Media Streaming in accordance with various embodiments.

FIG. 7A is a call flow diagram illustrating interactions between a Media Session Handler (e.g., Media Session Handler 402) and Media Player (e.g., 403) of a wireless device (e.g., 120a-120e, 200, 320, 415) and an AF server (e.g., 401) of a 5GS network (e.g., 100) for supporting metrics collection and reporting for downlink 5G Media Streaming in accordance with various embodiments. With reference to FIGS. 1-7A, FIG. 7A illustrates an example scenario in which metrics reports from the 5GMSd UE may be initially sent to the 5GMSd AF. Metrics to be measured, collected and reported may be defined by 3GPP and/or by a third party entity according to the metrics configuration scheme. In FIG. 7A, the OAM Server role may be implemented by the NWDAF (Network Data Analytics Function).

The example interactions illustrated in FIG. 7A, may be interactions according to one or more operations of methods 500 (FIG. 5A), 550 (FIG. 5B), 600 (FIG. 6A), and/or 650 (FIG. 6B).

In step 1, the 5GMSd AF may be provisioned with metrics configuration information regarding metrics measurement, collection and subsequent collection of the Media Player's metrics measurements by the Media Session Handler as well as on delivery by the Media Session Handler of metrics reports derived from the collected metrics information to the 5GMSd AF. The 5GMSd AF may be additionally provisioned with configuration information on required metrics post-processing functionality and subsequent delivery of processed metric reports to the OAM Server and/or the 5GMSd Application Provider.

In step 2, the Service announcement information may be provided from the 5GMSd Application Provider to the 5GMS UE to enable service discovery and access.

In step 3, metrics configuration information may be passed from the 5GMSd AF to the Media Session Handler and in turn forwarded to the Media Player.

In step 4, time passes until the 5GMSd UE initiates session establishment and media playback.

In step 5, streaming session may be set up between the Media Session Handler and the 5GMSd AF in response to indication from the 5GMSd-aware Application via the Media Player of impending media playback.

In step 6, media session(s) may be set up between the Media Player and the 5GMSd AS in response to indication from the 5GMSd aware Application of impending media playback.

In step 7, the Media Session Handler queries the Media Player on its capability to collect and report metrics as defined by its metrics configuration.

In step 8, the Media Player acknowledges that the required metrics may be collected and reported. If the request cannot be supported by the Media Player, an error message shall be sent by the Media Session Handler to the appropriate network entity, indicating that metrics reporting cannot be supported for this streaming service. Steps 7 and 8 may be repeated for each metrics collection scheme, should multiple metrics schemes be applicable.

During the course of media playback, steps 9-16 may be repeated, depending on the duration of the playback and the frequency of metrics reporting as set by the metrics configuration.

In step 9, assuming a live streaming service, media content may be delivered via push delivery from the 5GMSd Application Provider to the 5GMSd AS.

In step 10, the Media Player fetches media content from the 5GMSd AS and begins media playback.

In step 11, the Media Player notifies the Media Session Handler of the start of media playback.

In step 12, the Media Session Handler activates countdown of its metrics reporting interval timer.

In step 13, upon expiration of the timer, the Media Session Handler requests and obtains the collected metrics from the Media Player.

In step 14, in accordance to its metrics configuration as provisioned in step 3, metrics may be reported by the Media Session Handler to the 5GMSd AF.

In step 15, in accordance to its metrics configuration as provisioned in step 1, the 5GMSd AF performs post-processing (e.g. filtering, aggregation, reformatting) of the received metrics report.

Furthermore, in accordance to its metrics configuration as provisioned in step 1, in step 16a, the 5GMSd AF sends a processed metrics report directly to the 5GMSd Application Provider, or in step 16b, the 5GMSd AF sends the processed metrics report to the OAM Server, or in step 16c, the 5GMSd AF sends the processed metrics report to both the OAM Server and the 5GMSd Application Provider. In this example, the OAM server forwards a copy of its received metric report to the 5GMSd Application Provider. As an alternative method, the 5GMSd AF performs separate deliveries of metric reports, which may differ in the way these reports may be processed by the AF, to the OAM server and the Application Provider.

Upon the termination of media playback as notified by the 5GMSd-aware Application to the Media Player, a final round of metrics collection and reporting may be performed.

In step 17, the Media Session Handler requests and obtains the collected metrics from the Media Player. This procedure might occur prior to the nominal expiration of the metrics reporting interval timer.

In step 18, the final metrics report may be sent by the Media Session Handler to the 5GMSd AF. This procedure might occur prior to the expiration of the nominal reporting interval.

In step 19, the 5GMSd AF performs post-processing of the received final metrics report.

In step 20a, the same operations as discussed with reference to step 15a may be performed. In step 20b, the same operations as discussed with reference to step 15b may be performed. In step 20c, the same operations as discussed with reference to step 15c may be performed. Although not explicitly shown or described in FIG. 7A, should the 5GMSd AF represent an untrusted network entity and the OAM Server represent a trusted network entity, the delivery of processed metric reports from the 5GMSd AF to the OAM Server, as depicted in steps 16b, 16c, 20b and 20c, may be mediated by the NEF (Network Exposure Function).

Figure 7B:
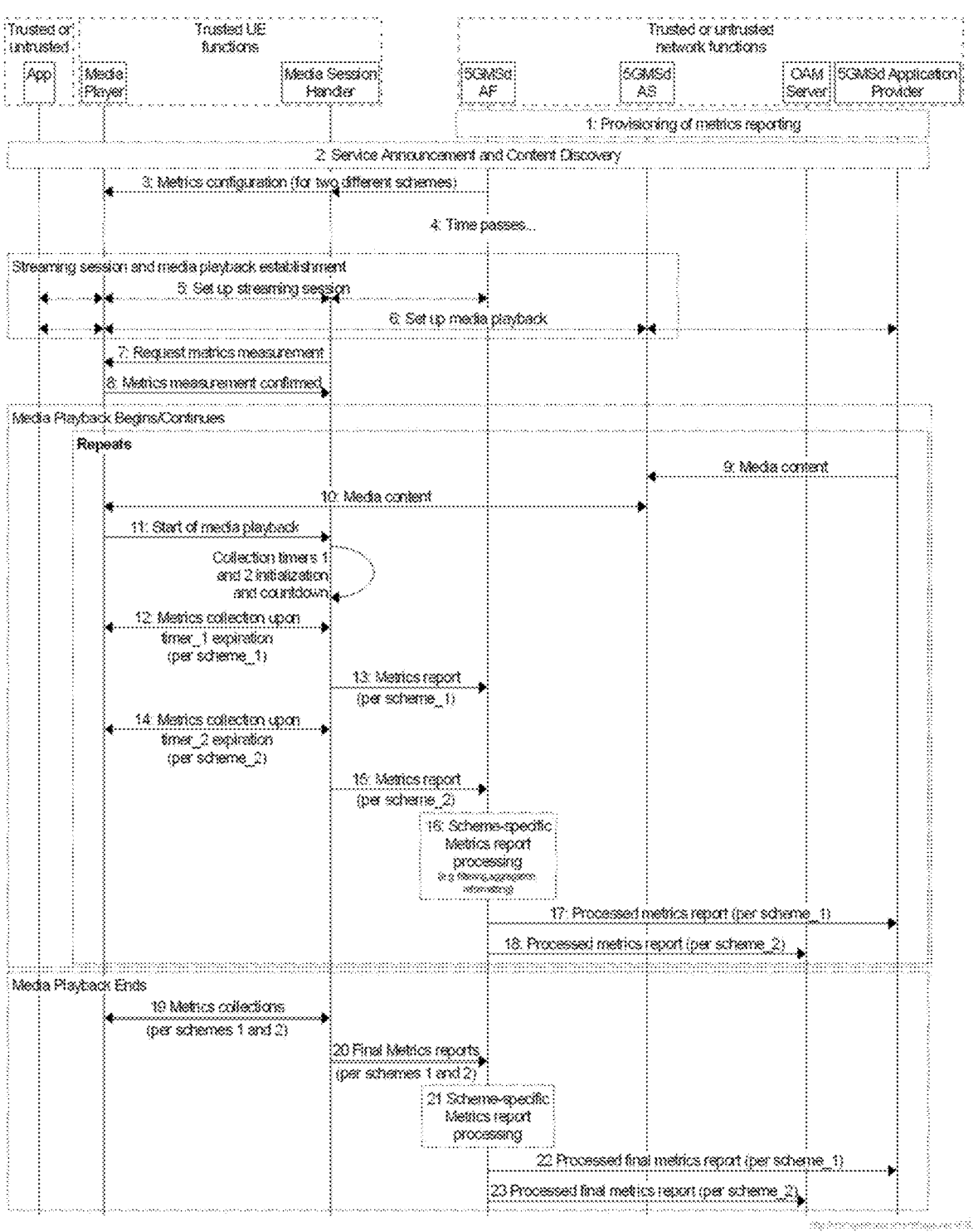
FIG. 7B is a call flow diagram illustrating interactions between a Media Session Handler and Media Player of a wireless device and an AF server of a 5GS network for supporting metrics collection and reporting for downlink 5G Media Streaming in accordance with various embodiments.

FIG. 7B is a call flow diagram illustrating interactions between a Media Session Handler (e.g., Media Session Handler 402) and Media Player (e.g., 403) of a wireless device (e.g., 120a-120e, 200, 320, 415) and an AF server (e.g., 401) of a 5GS network (e.g., 100) for supporting metrics collection and reporting for downlink 5G Media Streaming in accordance with various embodiments. With reference to FIGS. 1-7B, FIG. 7B illustrates an example scenario in which metrics reports from the 5GMSd UE may be sent to the 5GMSd AF. In this example in FIG. 7B, it is assumed that the metrics configuration provisioned to the 5GMSd AF includes instructions/rules on metrics measurement, collection and reporting for two different schemes—one defined and provisioned by the third party Application Provider, and the other scheme defined by 3GPP and provisioned by the OAM Server. In addition, each metrics scheme requires the 5GMSd Client to perform its own metrics measurement, collection and reporting—i.e., separate measurement and collection procedures within the 5GMSd Client and separate sending of metrics reports by the 5GMSd Client to the 5GMSd AF. Furthermore, in this example in FIG. 7B, it is assumed that the 5GMSd AF is required to perform separate procedures on post-processing of each type of metrics report it receives from the 5GMSd Client and subsequent sending of the processed reports to the appropriate destination servers, in accordance to the metrics scheme (in this case, the Third-party Application Provider server for the third-party scheme and the OAM Server for the 3GPP scheme. The example interactions illustrated in FIG. 7B, may be interactions according to one or more operations of methods 500 (FIG. 5A), 550 (FIG. 5B), 600 (FIG. 6A), and/or 650 (FIG. 6B)

In step 1, the 5GMSd AF may be provisioned with two separate sets of metrics configuration information—metrics scheme_1 as defined by the third-party Application Provider and metrics scheme_2 as defined by 3GPP, each pertaining to metrics for measurement by the Media Player, collection from the Media Player by the Media Session Handler, and delivery of metrics reports from the Media Session Handler to the 5GMSd AF. The 5GMSd AF may be similarly provisioned with two separate sets of metrics configuration information, associated with the metrics schemes 1 and 2, regarding required post-processing functionality and subsequent and separate delivery of processed metrics reports to the 5GMSd Application Provider and to the OAM Server.

In step 2, the Service announcement information may be provided from the 5GMSd Application Provider to the 5GMSd UE to enable service discovery and access.

In step 3, the Metrics configuration information associated with schemes 1 and 2 may be passed from the 5GMSd AF to the Media Session Handler and in turn forwarded to the Media Player.

In step 4, time passes until the 5GMSd UE initiates session establishment and media playback.

In step 5, the Streaming session may be set up between the Media Session Handler and the 5GMSd AF in response to indication from the 5GMSd-aware Application via the Media Player of impending media playback.

In step 6, the Media session(s) may be set up between the Media Player and the 5GMSd AS in response to indication from the 5GMSd aware Application of impending media playback.

In step 7, the Media Session Handler queries the Media Player on its capability to measure metrics in accordance to both schemes 1 and 2 as defined by its metrics configuration.

In step 8, the Media Player acknowledges its support for measurement of the required metrics of both schemes. If the request cannot be supported by the Media Player (e.g., inability to measure metrics according to one of the two schemes), an error message shall be sent by the Media Session Handler to the appropriate network entity, indicating that metrics reporting for the indicated metrics scheme cannot be supported for this streaming service.

During the course of media playback, steps 9-18 may be repeated, depending on the duration of the playback and the frequency of metrics reporting as set by the metrics configuration for each of the two schemes.

In step 9, assuming a live streaming service, media content may be delivered via push delivery from the 5GMSd Application Provider to the 5GMSd AS.

In step 10, the Media Player fetches media content from the 5GMSd AS and begins media playback.

In step 11, the Media Player notifies the Media Session Handler of the start of media playback, causing the Media Session Handler to initialize and begin countdown of separate metrics collection timers for schemes 1 and 2.

In step 12, upon expiration of the timer_1 (associated with scheme_1), the Media Session Handler collects the metrics measurements from the Media Player according to scheme_1.

In step 13, in accordance to its metrics configuration as provisioned in step 3, a metrics report for scheme_1 may be sent from the Media Session Handler to the 5GMSd AF.

In step 14, upon expiration of the timer_2 (associated with scheme_2), the Media Session Handler collects the metrics measurements from the Media Player according to scheme_2.

In step 15, in accordance to its metrics configuration as provisioned in step 3, a metrics report for scheme_2 may be sent from the Media Session Handler to the 5GMSd AF.

In step 16, in accordance to its metrics configuration as provisioned in step 1, the 5GMSd AF performs separate post-processing in accordance with schemes 1 and 2 (e.g. filtering, aggregation, reformatting) of the previously received types of metrics reports.

Furthermore, in accordance to its metrics configuration as provisioned in step 1, in step 17, the 5GMSd AF sends a processed metrics report in accordance with scheme_1 to the 5GMSd Application Provider.

In step 18, the 5GMSd AF sends a processed metrics report in accordance with scheme_2 to the OAM Server.

Upon the termination of media playback as notified by the 5GMSd-aware Application to the Media Player, a final round of metrics collection and reporting may be performed.

In step 19, the Media Session Handler requests and obtains the latest metrics measurements from the Media Player in accordance with schemes 1 and 2. These procedures might occur prior to the nominal expiration of the metrics collection timers.

In step 20, the final metrics reports, in accordance with schemes 1 and 2 may be sent by the Media Session Handler to the 5GMSd AF. These procedures might occur prior to the expiration of the nominal reporting intervals.

In step 21, the 5GMSd AF performs post-processing of the received final metrics reports in accordance with schemes 1 and 2.

In step 22, the same operations as discussed with reference to step 17 may be performed. In step 23, the same operations as discussed with reference to step 18 may be performed. Although not explicitly shown or described in FIG. 7B, should the 5GMSd AF represent an untrusted network entity and the OAM Server represent a trusted network entity, the delivery of processed metric reports from the 5GMSd AF to the OAM Server, as depicted in steps 18 and 23, may be mediated by a NEF (Network Exposure Function).

Figure 8:
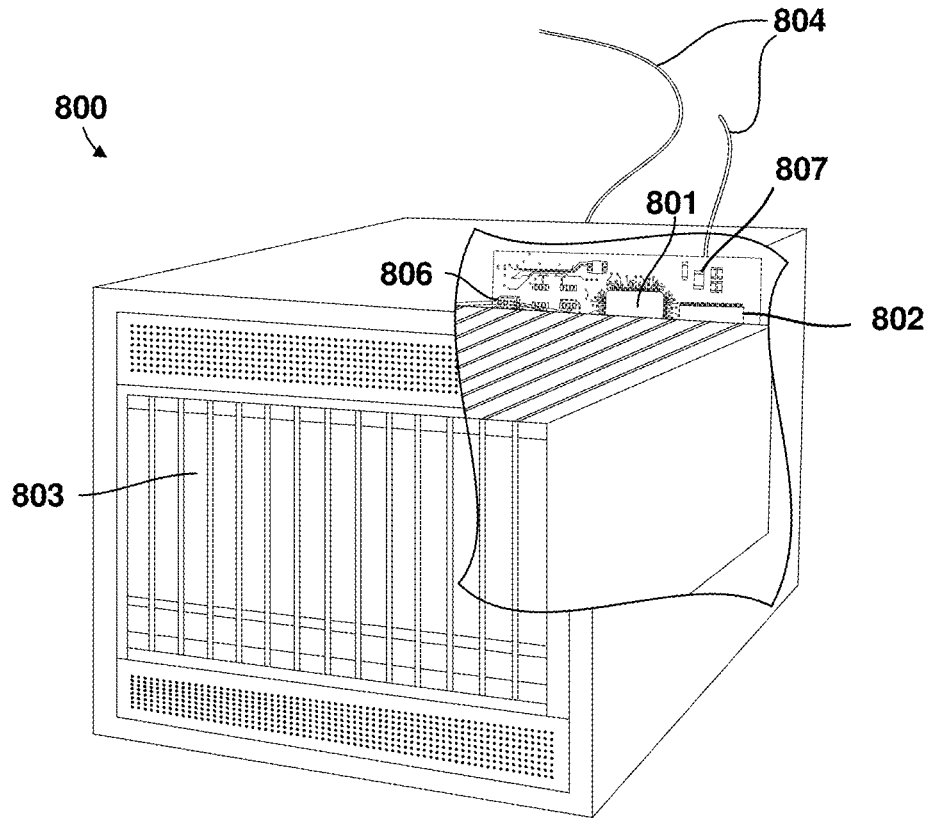
FIG. 8 is a component block diagram of a network computing device suitable for use with various embodiments.

FIG. 8 is a component block diagram of a network computing device 800 suitable for use with various embodiments. Such network computing devices may include at least the components illustrated in FIG. 8. With reference to FIGS. 1-8, the network computing device 800 (e.g., an AF server, such as AF server 401, etc.) may include a processor 801 coupled to volatile memory 802 and a large capacity nonvolatile memory, such as a disk drive 803. The network computing device 800 may also include a peripheral memory access device such as a floppy disc drive, compact disc (CD) or digital video disc (DVD) drive 806 coupled to the processor 801. The network computing device 800 may also include network access ports 804 (or interfaces) coupled to the processor 801 for establishing data connections with a network, such as the Internet and/or a local area network coupled to other system computers and servers. The network computing device 800 may include one or more antennas 807 for sending and receiving electromagnetic radiation that may be connected to a wireless communication link. The network computing device 800 may include additional access ports, such as USB, Firewire, Thunderbolt, and the like for coupling to peripherals, external memory, or other devices.

Figure 9:
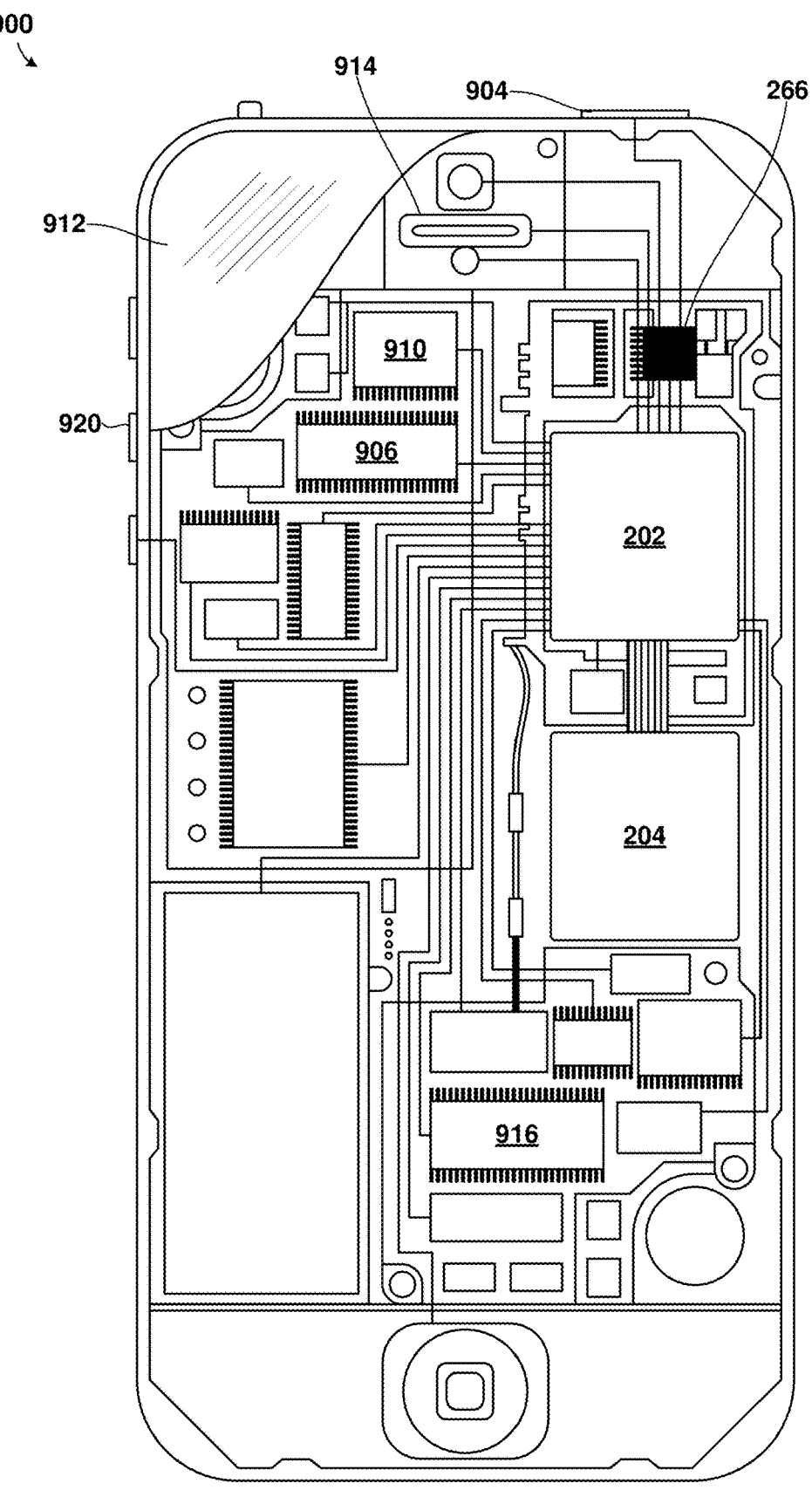
FIG. 9 is a component block diagram of a wireless device suitable for use with various embodiments.

FIG. 9 is a component block diagram of a wireless device 900 suitable for use with various embodiments. With reference to FIGS. 1-9, various embodiments may be implemented on a variety of wireless devices 900 (e.g., the wireless device 120a-120e, 200, 320, 415), an example of which is illustrated in FIG. 9 in the form of a smartphone. The wireless device 900 may include a first SOC 202 (e.g., a SOC-CPU) coupled to a second SOC 204 (e.g., a 5G capable SOC). The first and second SOCs 202, 204 may be coupled to internal memory 906, 916, a display 912, and to a speaker 914. Additionally, the wireless device 900 may include an antenna 904 for sending and receiving electromagnetic radiation that may be connected to a wireless data link and/or cellular telephone transceiver 266 coupled to one or more processors in the first and/or second SOCs 202, 204. The wireless device 900 may also include menu selection buttons or rocker switches 920 for receiving user inputs.

The wireless device 900 also includes a sound encoding/decoding (CODEC) circuit 910, which digitizes sound received from a microphone into data packets suitable for wireless transmission and decodes received sound data packets to generate analog signals that are provided to the speaker to generate sound. Also, one or more of the processors in the first and second SOCs 202, 204, wireless transceiver 266 and CODEC 910 may include a digital signal processor (DSP) circuit (not shown separately).

The processors of the wireless network computing device 900 and the wireless device 900 may be any programmable microprocessor, microcomputer or multiple processor chip or chips that can be configured by software instructions (applications) to perform a variety of functions, including the functions of the various embodiments described below. In some mobile devices, multiple processors may be provided, such as one processor within an SOC 204 dedicated to wireless communication functions and one processor within an SOC 202 dedicated to running other applications. Software applications may be stored in the memory 906, 916 before they are accessed and loaded into the processor. The processors may include internal memory sufficient to store the application software instructions.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a wireless device and the wireless device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general packet radio service (GPRS), code division multiple access (CDMA) systems (e.g., cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 500, 550, 600, and/or 650 may be substituted for or combined with one or more operations of the methods 500, 550, 600, and/or 650.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method for supporting metrics measurement, collection and reporting for a Fifth Generation (5G) Media Streaming service performed by a processor of an application function (AF) server of a 5G system (5GS) network, comprising:

sending a metrics configuration message to a wireless device via a control plane based M5 interface included in the 5GS network, wherein the metrics configuration message includes a plurality of metrics scheme parameters including a first metrics scheme parameter identified by a first uniform resource identifier (URI) and a second metrics scheme parameter identified by a second URI different than the first URI, the first metrics scheme parameter representing a first metrics scheme and the second metrics scheme parameter representing a second metrics scheme different than the first metrics scheme, the first metrics scheme defining first metrics measurement, collection, and reporting requirements for a first list of metrics associated with the first metrics scheme, and the second metrics scheme defining second metrics measurement, collection, and reporting requirements for a second list of metrics associated with the second metrics scheme;

establishing a media session for the 5G Media Streaming service with the wireless device, the media session including media data originating from an application provider; and receiving a first metrics report corresponding to the first metrics scheme and a second metrics report corresponding to the second metrics scheme from the wireless device via the control plane based M5 interface, the second metrics report being different than the first metrics report, and the first metrics report and the second metrics report each being associated with the media data originating from the application provider, wherein the first metrics report includes collected metrics for the media data originating from the application provider associated with the first list of metrics, and the second metrics report includes collected metrics for the media data originating from the application provider associated with the second list of metrics.

2. The method of claim 1, further comprising:

processing the first metrics report and the second metrics report to generate a processed metrics report; and providing the processed metrics report to at least one of an application server of the 5G Media Streaming service, an Operations, Administration and Maintenance (OAM) server of the 5GS network, the application provider, or a third-party server.

3. The method of claim 2, wherein processing the first metrics report and the second metrics report to generate the processed metrics report comprises at least one of filtering, aggregating, or reformatting the collected metrics.

4. The method of claim 2, wherein processing the first metrics report and the second metrics report to generate the processed metrics report comprises processing the first metrics report and the second metrics report to generate the processed metrics report according to at least one of one or more rules indicated by the application server of the 5G Media Streaming service, an OAM server of the 5GS network, the application provider, or a third-party Server.

5. The method of claim 1, wherein the first metrics measurement, collection and reporting requirements and the second metrics measurement, collection and reporting requirements comprise respective Quality of Experience (QoE) metrics associated with at least one of an application, content services provisioned from outside the 5GS network to the 5GS network, or metrics requested from outside the 5GS network.

6. The method of claim 1, wherein the first metrics scheme and the second metrics scheme are based on at least one of settings of the 5GS network or metrics scheme settings received from outside the 5GS network.

7. The method of claim 1, wherein the second metrics measurement, collection and reporting requirements include non-Third Generation Partnership Protocol (non-3GPP) metrics.

8. The method of claim 1, wherein the 5G Media Streaming service is an uplink 5G Media Streaming service or a downlink 5G Media Streaming service.

9. The method of claim 1, wherein the first URI specifies a first entity that defined the first metrics scheme, and the second URI specifies a second entity that defined the second metrics scheme.

10. The method of claim 9, wherein the first entity comprises Third Generation Partnership Project (3GPP).

11. The method of claim 10, wherein the second entity comprises the application provider, the application provider being separate from 3GPP.

12. A method for supporting metrics measurement, collection and reporting for Fifth Generation (5G) Media Streaming service performed by a Media Session Handler running on a processor of a wireless device connected to a radio access network (RAN) of a 5G system (5GS) network, comprising:

receiving a metrics configuration message from an application function (AF) server of the 5GS network via an application layer control plane based M5 interface, wherein the metrics configuration message includes a plurality of metrics scheme parameters including a first metrics scheme parameter identified by a first uniform resource identifier (URI) and a second metrics scheme parameter identified by a second URI different than the first URI, the first metrics scheme parameter representing a first metrics scheme and the second metrics scheme parameter representing a second metrics scheme different than the first metrics scheme, the first metrics scheme defining first metrics measurement, collection, and reporting requirements for a first list of metrics associated with the first metrics scheme, and the second metrics scheme defining second metrics measurement, collection, and reporting requirements for a second list of metrics associated with the second metrics scheme;

establishing a media session for the 5G Media Streaming service with the AF server, the media session including media data originating from an application provider;

determining the first list of metrics and the second list of metrics to be collected for the media data of the media session based at least in part on the first metrics scheme parameter representing the first metrics scheme and the second metrics scheme parameter representing the second metrics scheme;

querying a Media Player of the wireless device to determine whether the Media Player has a capability to measure and log the first list of metrics associated with the first metrics scheme and the second list of metrics associated with the second metrics scheme;

determining that the Media Player has the capability to measure and log the first list of metrics and the second list of metrics;

starting media playback of the media data of the media session;

collecting first metrics associated with the first list of metrics and second metrics associated with the second list of metrics for the media data from the Media Player after the start of the media playback;

based on the collected first metrics according to the first metrics scheme, generating a first metrics report associated with the media playback of the media data;

based on the collected second metrics according to the second metrics scheme, generating a second metrics report associated with the media of the media data; and sending the first metrics report and the second metrics report associated with the media playback to the AF server via the application layer control plane based M5 interface.

13. The method of claim 12, wherein the second metrics scheme is a non-3rd Generation Partnership Project (non-3GPP) metrics scheme specified by a non-3GPP entity.

14. The method of claim 12, wherein the first metrics scheme defines a periodic request triggering condition.

15. The method of claim 14, wherein the periodic request triggering condition is an interval timer expiration, a streamed content amount threshold being reached, or an occurrence of a specified event.

16. The method of claim 12, wherein sending the first metrics report and the second metrics report associated with the media session to the AF server via the application layer control plane based M5 interface comprises sending the first metrics report and the second metrics report associated with the media playback to the AF server via the application layer control plane based M5 interface according to the first metrics scheme and the second metrics scheme.

17. The method of claim 16, wherein the first metrics scheme defines a first metrics reporting rule defining when to send the first metrics report.

18. The method of claim 17, wherein the first metrics reporting rule indicates a periodicity for sending the first metric report.

19. The method of claim 12, wherein the first list of metrics comprises Quality of Experience (QoE) metrics associated with an application or content service provisioned external to the 5GS network, and wherein the second list of metrics comprises metrics requested external to the 5GS network.

20. The method of claim 12, wherein sending the first metrics report and the second metrics report associated with the media playback to the AF server comprises sending the first metrics report to the AF server separately from the second metrics report.

21. An application function (AF) server of a Fifth Generation (5G) system (5GS) network, comprising:

a processor configured with processor-executable instructions to perform operations to:

send a metrics configuration message to a wireless device via a control plane based M5 interface included in the 5GS network, wherein the metrics configuration message includes a plurality of metrics scheme parameters including a first metrics scheme parameter identified by a first uniform resource identifier (URI) and a second metrics scheme parameter identified by a second URI different than the first URI, the first metrics scheme parameter representing a first metrics scheme and the second metrics scheme parameter representing a second metrics scheme different than the first metrics scheme, the first metrics scheme defining first metrics measurement, collection, and reporting requirements for a first list of metrics associated with the first metrics scheme, and the second metrics scheme defining second metrics measurement, collection, and reporting requirements for a second list of metrics associated with the second metrics scheme;

establish a media session for a 5G Media Streaming service with the wireless device, the media session including media data originating from an application provider; and receive a first metrics report corresponding to the first metrics scheme and a second metrics report corresponding to the second metrics scheme from the wireless device via the control plane based M5 interface, the second metrics report being different than the first metrics report, and the first metrics report and the second metrics report each being associated with the media data originating from the application provider, wherein the first metrics report includes collected metrics for the media data originating from the application provider associated with the first list of metrics, and the second metrics report includes collected metrics for the media data originating from the application provider associated with the second list of metrics.

22. The AF server of claim 21, where the processor is further configured with processor-executable instructions to:

process the first metrics report and the second metrics report to generate a processed metrics report; and provide the processed metrics report to at least one of an application server of the 5G Media Streaming service, an Operations, Administration and Maintenance (OAM) server of the 5GS network, the application provider, or a third-party server.

23. A wireless device for supporting metrics measurement, collection and reporting for a Fifth Generation (5G) Media Streaming service performed by a processor of an application function (AF) server of a 5G system (5GS) network, the wireless device comprising:

a processor configured with processor-executable instructions to perform operations to:

receive a metrics configuration message from the AF server of the 5GS network via an application layer control plane based M5 interface, wherein the metrics configuration message includes a plurality of metrics scheme parameters including a first metrics scheme parameter identified by a first uniform resource identifier (URI) and a second metrics scheme parameter identified by a second URI different than the first URI, the first metrics scheme parameter representing a first metrics scheme and the second metrics scheme parameter representing a second metrics scheme different than the first metrics scheme, the first metrics scheme defining first metrics measurement, collection, and reporting requirements for a first list of metrics associated with the first metrics scheme, and the second metrics scheme defining second metrics measurement, collection, and reporting requirements for a second list of metrics associated with the second metrics scheme;

establish a media session for the 5G Media Streaming service with the AF server, the media session including media data originating from an application provider;

determine the first list of metrics and the second list of metrics to be collected for the media data of the media session based at least in part on the first metrics scheme parameter representing the first metrics scheme and the second metrics scheme parameter representing the second metrics scheme;

query a Media Stream Handler of the wireless device to determine whether the Media Stream Handler has a capability to measure and log the first list of metrics associated with the first metrics scheme and the second list of metrics associated with the second metrics scheme;

determine that the Media Stream Handler has the capability to measure and log the first list of metrics and the second list of metrics;

start media playback of the media data of the media session;

collect first metrics associated with the first list of metrics and second metrics associated with the second list of metrics for the media data from the Media Stream Handler after the start of the media playback;

based on the collected first metrics according to the first metrics scheme, generate a first metrics report associated with the media playback of the media data;

based on the collected second metrics according to the second metrics scheme, generate a second metrics report associated with the media playback of the media data; and send the first metrics report and the second metrics report associated with the media playback to the AF server via the application layer control plane based M5 interface.

24. The wireless device of claim 23, wherein the second metrics scheme is a non-3rd Generation Partnership Project (non-3GPP) metrics scheme specified by a non-3GPP entity.

25. The wireless device of claim 23, wherein the first metrics scheme defines a periodic request triggering condition.

26. The wireless device of claim 25, wherein the periodic request triggering condition is an interval timer expiration, a streamed content amount threshold being reached, or an occurrence of a specified event.

27. The wireless device of claim 23, wherein the processor is further configured with processor-executable instructions to perform operations to send the first metrics report and the second metrics report associated with the media playback to the AF server via the application layer control plane based M5 interface according to the first metrics scheme and the second metrics scheme.

28. The wireless device of claim 23, wherein the first list of metrics comprises Quality of Experience (QoE) metrics associated with an application or content service provisioned external to the 5GS network, and wherein the second list of metrics comprises metrics requested external to the 5GS network.

* * * * *